(12) United States Patent
Rosenhouse et al.

(10) Patent No.: US 12,347,298 B2
(45) Date of Patent: Jul. 1, 2025

(54) TARGET MONITORING AND ALERT SYSTEM AND METHOD

(71) Applicant: VAYYAR IMAGING LTD., Yehud (IL)

(72) Inventors: Tsachi Rosenhouse, Kiryat Ono (IL); Alon Keren, Tel Aviv (IL); Shay Moshe, Petach-Tikva (IL); Amit Dvash, Kadima-Zoran (IL); Ido Klemer, Givatayim (IL); Michael Orlovsky, Hod Ha-Sharon (IL); Ronen Tur, Binyamina (IL); Rotem Barda, Tel Aviv (IL)

( * ) Notice: Subject to any disclaimer, the term of this patent is extended or adjusted under 35 U.S.C. 154(b) by 0 days.

(21) Appl. No.: 18/037,127

(22) PCT Filed: Jun. 1, 2022

(86) PCT No.: PCT/IB2022/055109
§ 371 (c)(1),
(2) Date: May 16, 2023

(87) PCT Pub. No.: WO2022/254347
PCT Pub. Date: Dec. 8, 2022

(65) Prior Publication Data
US 2024/0021062 A1    Jan. 18, 2024

Related U.S. Application Data

(63) Continuation-in-part of application No. 17/632,522, filed as application No. PCT/IB2020/062383 on Dec. 23, 2020, now Pat. No. 11,660,023.
(Continued)

(51) Int. Cl.
*G08B 21/04* (2006.01)
*G01S 7/41* (2006.01)
(Continued)

(52) U.S. Cl.
CPC ............ *G08B 21/043* (2013.01); *G01S 7/415* (2013.01); *G01S 7/417* (2013.01); *G01S 13/723* (2013.01);
(Continued)

(58) Field of Classification Search
CPC ......... G01S 13/66; G01S 13/88; A61B 5/746; A61B 5/1116; A61B 5/1117; A61B 5/1126
See application file for complete search history.

(56) References Cited

U.S. PATENT DOCUMENTS 5,150,317 A * 9/1992 Countryman ...... H03H 21/0012
708/300
7,567,200 B1 * 7/2009 Osterweil ............... G01S 13/56
342/28
(Continued)

FOREIGN PATENT DOCUMENTS

CN          111627185 A  *  9/2020
WO        2021/050966 A1     3/2021

OTHER PUBLICATIONS

Sapana K. Mishra, et al., Human Motion Detection and Video Surveillance Using MATLAB, International Journal of Scientific Engineering and Research (IJSER), Jul. 2015, vol. 3, Issue 7, IJSER, Maharashtra, India.
(Continued)

*Primary Examiner* — Nathaniel J Kolb
(74) *Attorney, Agent, or Firm* — AlphaPatent Associates Ltd.; Daniel J. Swirsky

(57) ABSTRACT

Target monitoring and alert systems for identifying and tracking targets within radar data. Raw frame data is filtered to remove data relating to reflections from static objects. Moving targets are identified in the filtered data and their location is tracked over time generating target data. Neural networks may process the target data, calculate a fall like-
(Continued)

lihood score and generate a fall-alert if this is above an alert-threshold. A person identification module may extract the position and motion characteristics of each target from the data and generate a probabilistic identification of the target with a person.

16 Claims, 36 Drawing Sheets

Related U.S. Application Data

(60) Provisional application No. 63/195,189, filed on Jun. 1, 2021, provisional application No. 63/196,240, filed on Jun. 3, 2021, provisional application No. 63/210,601, filed on Jun. 15, 2021, provisional application No. 63/211,828, filed on Jun. 17, 2021, provisional application No. 63/024,520, filed on May 14, 2020, provisional application No. 62/954,507, filed on Dec. 29, 2019, provisional application No. 62/954,506, filed on Dec. 29, 2019, provisional application No. 62/954,505, filed on Dec. 29, 2019, provisional application No. 62/954,502, filed on Dec. 29, 2019, provisional application No. 62/952,540, filed on Dec. 23, 2019, provisional application No. 62/952,536, filed on Dec. 23, 2019, provisional application No. 62/952,525, filed on Dec. 23, 2019, provisional application No. 62/952,519, filed on Dec. 23, 2019.

(51) Int. Cl.
*G01S 13/72* (2006.01)
*G08B 21/18* (2006.01)

(52) U.S. Cl.
CPC ....... *G08B 21/0469* (2013.01); *G08B 21/182* (2013.01)

(56) References Cited

U.S. PATENT DOCUMENTS

| | | | |
|---|---|---|---|
| 2007/0139517 A1 | 6/2007 | Jenkins | |
| 2013/0002434 A1* | 1/2013 | Cuddihy | G01S 13/18 342/28 |
| 2013/0083246 A1 | 4/2013 | Chen et al. | |
| 2015/0223733 A1* | 8/2015 | Al-Alusi | G01S 13/50 600/407 |
| 2015/0309579 A1 | 10/2015 | Wang et al. | |
| 2016/0238737 A1 | 8/2016 | Janet et al. | |
| 2016/0377705 A1* | 12/2016 | Zack | A61B 5/7282 342/21 |
| 2018/0189930 A1 | 7/2018 | Dannels | |
| 2018/0335380 A1 | 11/2018 | Schmidt et al. | |
| 2019/0011549 A1 | 1/2019 | Mercuri et al. | |
| 2020/0011968 A1* | 1/2020 | Hammes | G01S 13/931 |
| 2020/0209378 A1 | 7/2020 | Yokev et al. | |
| 2021/0096216 A1 | 4/2021 | Rigazio et al. | |
| 2021/0321222 A1* | 10/2021 | Lagace | G01S 13/56 |

OTHER PUBLICATIONS

Klavestad, et al. "Monitoring activities of daily living using UWB radar technology: a contactless approach." IoT Oct. 30, 2020, vol. 1 No. 2 pp. 320-336, MDPI, Basel, SW.

Nirmal, et al. "Deep learning for radio-based human sensing: Recent advances and future directions." IEEE Communications Surveys & Tutorials, Feb. 7, 2021, vol. 23, No. 2, pp. 995-1019, IEEE, Piscataway, NJ, US.

Cippitelli, et al. "Radar and RGB-depth sensors for fall detection: A review." IEEE Sensors Journal, Jun. 15, 2017, vol. 17, No. 12, pp. 3585-3604, IEEE, Piscataway, NJ, US.

* cited by examiner

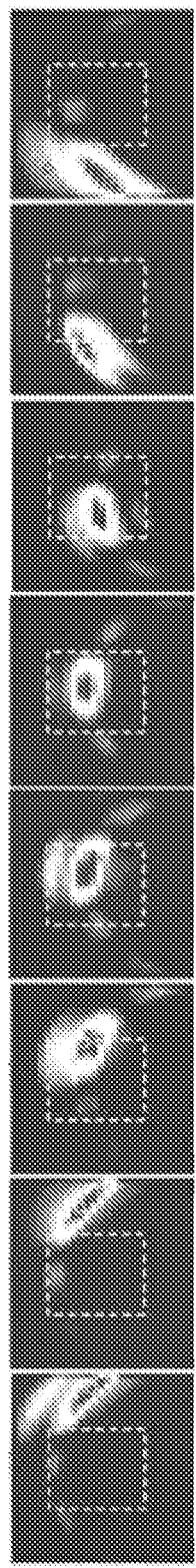

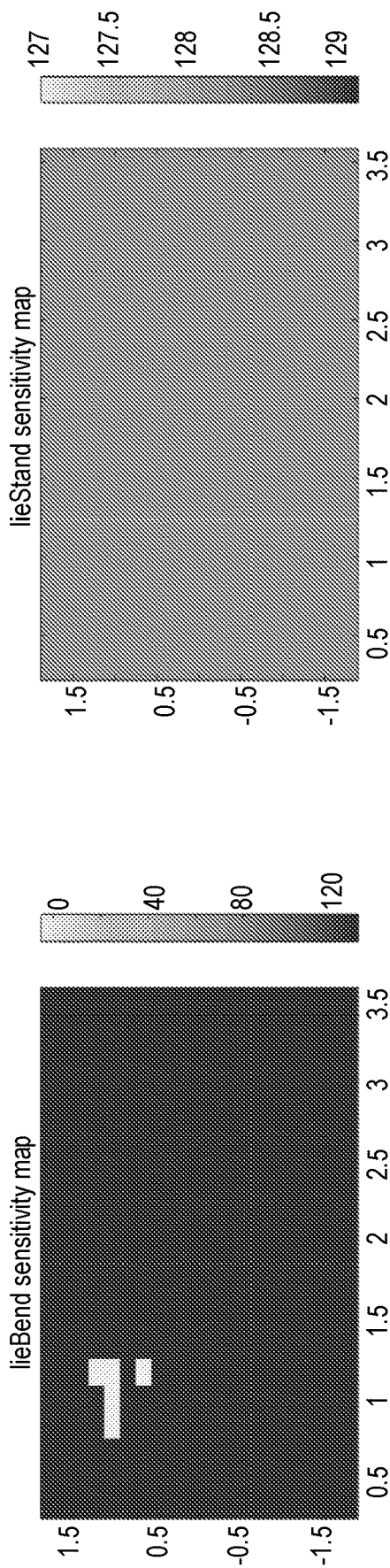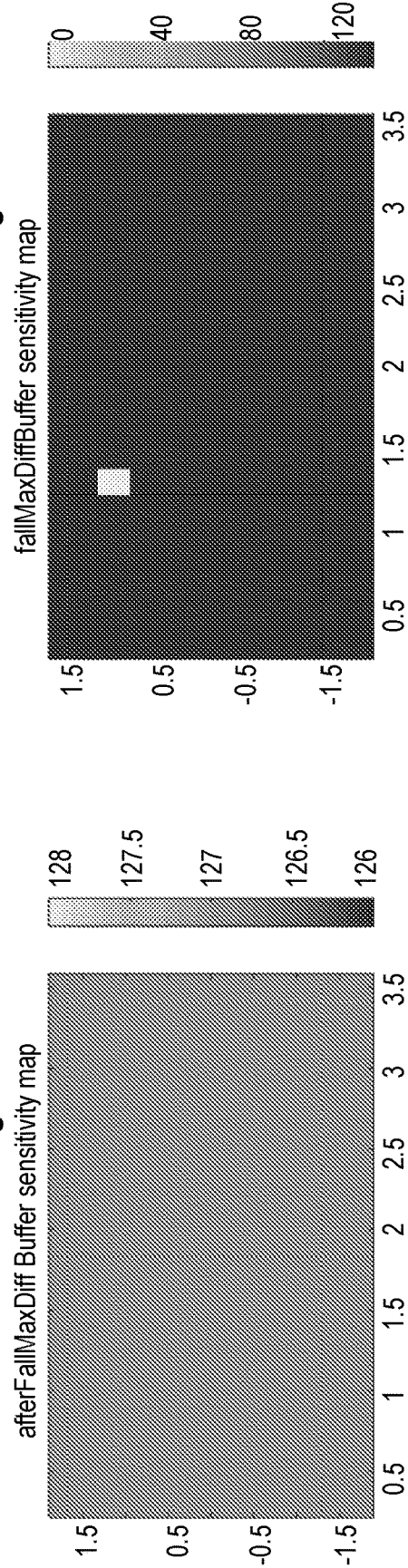
Fig. 19D lieBend sensitivity map
Fig. 19E lieStand sensitivity map
Fig. 19F afterFallMaxDiff Buffer sensitivity map
Fig. 19G fallMaxDiffBuffer sensitivity map

TARGET MONITORING AND ALERT SYSTEM AND METHOD

FIELD OF THE INVENTION

The disclosure herein relates to systems and methods for identification and tracking of targets in a monitored region. In particular the disclosure relates to the use of radar chips to identify subjects within a monitored region and to alert third parties if a fall event is detected.

BACKGROUND

Target monitoring systems are used in various scenarios. For example fall detection is an important application especially for senior citizens who live alone in homes and apartments and are isolated from people who could help them in an emergency. For such people, a fall, injury, or life threatening medical conditions can go undetected by family or support staff for an extended period of time. Some wearable and handheld devices are available which comprise of emergency call buttons, however, these need to be manually activated to alert others when assistance is needed. In case an elderly person falls down, he may not be in a position to activate the emergency button and call someone for help.

Another solution available for fall detection is through video camera surveillance. However, video camera surveillance is not a viable solution as it requires constant viewing of the video to know for fall detection or any help required by the person.

Furthermore, target monitoring systems, may distinguish between individuals within a group or a crowd, which may be important for a variety of reasons. For example, when multiple subjects within a common target zone are being individually monitored, say for ongoing health tracking or for fall-risk it is often required to identify each individual within the monitored region. There is therefore a need for a method enabling individuals to be distinguished within a crowd.

In still other applications, target monitoring may be required for security reasons. People entering a certain premises may require a proper authenticated identification. As the risk is getting prevalent, identification of the people has been a major concern. There are already many conventional arts which identify people on the basis of various parameters for example, showing identity cards to security, which is very easy to forge. Other electronic methods for people identification are based on identification of various parameters such as biometric based fingerprinting, eye pupil matching, face recognition, voice matching, scanning images-photograph matching, and so on. Such methods involve close proximity of a person to people identification devices/apparatuses. For example, biometric fingerprinting allows touch of the finger or thumb on the biometric machine, photograph matching requires person's face or body in close proximity of the camera or capturing machine. There are some methods which provide identification of a person remotely. For example, remote asynchronous identification through video involves registering record in streaming, validating thereof through an agent, client further showing identity document thereof analyzed by artificial intelligence, etc. The existing conventional methods involve a series of steps which are dependent upon physical identity documents which are easy to forge. Hence, none of the conventional technologies provide people identification from a distance without requiring any input from the subject person. Remote identification is very much required as such identification can be helpful in various applications like locating terrorists, missing persons, children, old people, and pets, identifying strangers, and so on.

The need remains for improved target monitoring. The current disclosure addresses this need.

SUMMARY OF THE EMBODIMENTS

According to one aspect of the presently disclosed subject matter, a target monitoring and alert system is introduced comprising a radar unit, a processor unit and a communication module. The radar unit may include at least one transmitter antenna connected to an oscillator and configured to transmit electromagnetic waves into a monitored region, and at least one receiver antenna configured to receive electromagnetic waves reflected by objects within the monitored region and operable to generate raw data. The processor unit may include a moving body isolation processor, and the communication module configured and operable to communicate alerts to third parties.

In various examples of the target monitoring and alert system the processor unit further comprises: a frame buffer memory unit for storing frame data; a data filter configured to receive the raw data, and operable to process the raw data to remove data relating to reflections from static objects thereby generating filtered data; a tracker module configured to receive the filtered data from the data filter and operable to process the filtered data to identify moving targets and to track the location of the moving targets over time thereby generating target data; and an alert-threshold generator operable to generate an alert-threshold.

Where appropriate, a neural network may be configured to receive from the tracker module target data inputs selected from height profiles, signal-to-noise ratio and radial distance to object and operable to generate a fall likelihood score. A fall identification module may be configured to receive the fall likelihood score from the neural network and to generate a fall alert if the likelihood score is above an alert-threshold value.

In some examples of the target monitoring and alert system the processor unit further comprises a person identification module including a position characteristic extraction module and a motion characteristic extraction module. Accordingly, the processor unit may be operable to generate a probabilistic identification of a target by applying a stored Artificial Intelligence (AI) algorithms on the position and motion characteristics of the target. The processor unit may be further operable to generate an identification profile of the person.

The alert-threshold generator may be configured to receive communication from a fall alert mitigation manager, which may be configured and operable to receive input from a telemetric system and to use a sensitivity map to generate the alert threshold value. The sensitivity map may comprise a binary file having a stack of two-dimensional arrays, for example a stack of ten two-dimensional arrays each having 20 rows and 20 columns.

Where appropriate, the data filter may include a temporal filter unit through which received data may be passed to produce filtered output, which may be operable to select a frame capture rate, to collect raw data from a first frame; to wait for a time delay, to collect raw data from a second frame; and to subtract first frame data from the second frame data.

Additionally or alternatively, the temporal filter comprises at least a moving target indication module, which may be operable to select a filter time constant, to apply an infinite impulse response filter over during the filter time constant, to apply a low pass filter, and to remove background from the raw data.

Optionally, the temporal filter may comprise at least an adaptive moving target indication module, which may be operable to select an initial filter time constant, to apply an infinite impulse response filter with the initial filter time constant, to apply a low pass filter, to subtract the result from the next frame, to detect changes in image data, and to update the filter time constant accordingly.

Variously, the temporal filter may comprise at least an extended moving target indication module, which may be operable to select a filter time constant, to apply an infinite impulse response filter during the filter time constant, to apply a low pass filter, to subtract a mean value of several previous frames from the current frame and to remove artifacts from the filtered image.

Additionally or alternatively, the temporal filter comprises at least a local adaptive moving target indication module, which may be operable to select an initial filter time constant, to apply an infinite impulse response filter with the initial filter time constant, to apply a low pass filter, to subtract the result from the next frame, to detect changes in image data, to segment the frame into subsets of voxels according to the local rate of change of image data, to set a local filter time constant for each subset of voxels as suits the local rate of change of image data, to apply the infinite impulse response filter to each subset of voxels over during an associated local filter time constant, and to subtract local background from each subset of voxels in a next frame of image data.

Where appropriate, the temporal filter may comprise at least a low motion signal-to-noise ratio enhancement module, which may be operable to apply a low signal-to-noise ratio temporal filter, to average energy values of the Moving Target Indication (MTI) images over several frames and to detect changes in the averaged data. Still other examples of the temporal filter may include at least a motion filter bank.

In some examples the temporal filter includes at least an afterimage removal module. Optionally, the afterimage removal module is operable to capture a default background image, to set the default background image to be the value for a background, to set a background threshold, to capture raw data for first frame, to subtract background from raw data to generate candidate filtered data, to calculate a difference between candidate filtered data and the last recorded frame image, and if the difference is above the threshold then subtract the default background from raw data to generate new filtered data, to record the new filtered data as next frame image, to update the background to the new frame image and to capture raw data for next frame. Additionally or alternatively, the afterimage removal module is operable to capture a default background image, to set the default background image to be the value for a background, to set a background threshold, to capture raw data for first frame, to subtract background from raw data to generate candidate filtered data, to calculate a difference between candidate filtered data and the last recorded frame image, and if the difference is below the threshold then to record the candidate filtered data as next frame image, to update the background to the new frame image and to capture raw data for next frame.

Other aspects of the current disclosure teach a method for monitoring targets within a monitored regions comprising: providing a radar unit comprising at least one transmitter antenna connected to an oscillator, and at least one receiver antenna; providing a processor unit including a moving body isolation processor; providing a communication module configured and operable to communicate alerts to third parties; the radar unit generating raw data by transmitting electromagnetic waves into the monitored region, and receiving electromagnetic waves reflected by objects within the monitored region; storing frame data in a frame buffer memory unit, generating filtered data by receiving raw data and removing data relating to reflections from static objects thereby generating filtered data; generating target data by identifying moving targets in the filtered data and tracking the location of the moving targets over time; generating an alert-threshold; training a neural network to receive target data inputs selected from height profiles, signal-to-noise ratio and radial distance to object and to generate a fall likelihood score; and generating a fall alert if the likelihood score is above an alert-threshold value.

In still another aspect of the invention, a system for remotely and non-intrusively performing identification of a person is disclosed. The system includes a radar-based person identification device, a processing unit, a database and a communicator.

In another aspect of the invention, the radar-based person identification device may include an array of transmitters and receivers which are configured to transmit a beam of electromagnetic radiations towards a monitored region and receive the electromagnetic waves reflected by objects within the monitored region, respectively. The device may also include a pre-processing unit for analyzing and processing the received electromagnetic waves. The pre-processing unit may include a plurality of characteristic extraction modules for the person(s) under identification. The pre-processing unit may include modules such as a position characteristic extraction module and a motion characteristic extraction module. The processing unit may generate a probabilistic identification of the person by applying the stored Artificial Intelligence (AI) algorithms on the position and motion characteristics of the person. The probabilistic identification may then be used to generate an identification profile of the person.

In a further aspect of the invention, identification profiles of the number of persons may be stored in the database. The communicator may then transmit the identification reports to the concerned departments through a communication network.

BRIEF DESCRIPTION OF THE FIGURES

For a better understanding of the embodiments and to show how it may be carried into effect, reference will now be made, purely by way of example, to the accompanying drawings.

With specific reference now to the drawings in detail, it is stressed that the particulars shown are by way of example and for purposes of illustrative discussion of selected embodiments only, and are presented in the cause of providing what is believed to be the most useful and readily understood description of the principles and conceptual aspects. In this regard, no attempt is made to show structural details in more detail than is necessary for a fundamental understanding; the description taken with the drawings making apparent to those skilled in the art how the various selected embodiments may be put into practice. In the accompanying drawings:

FIGS. 9A-H— show a series of frames tracking a target which briefly disappears from view before returning; and FIGS. 10A-H— show a series of frames tracking a target which passes through an excluded region;

FIGS. 19D, 19E, 19F and 19G are various examples of sensitivity maps;

DETAILED DESCRIPTION

Figure 1:
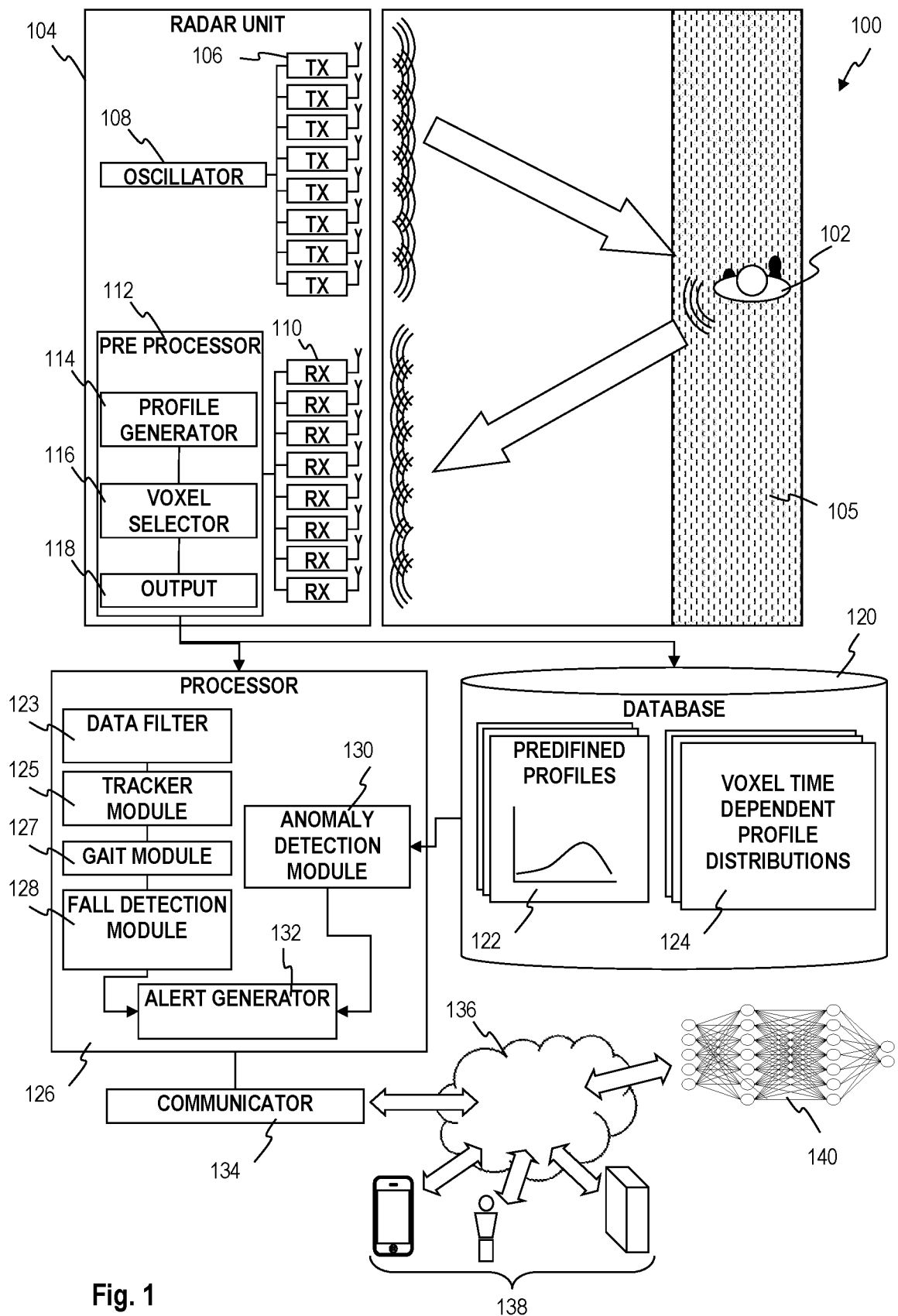
FIG. 1 is a schematic representation of a possible fall detection and alert system.

Aspects of the present disclosure relate to fall detection systems and methods. In particular the disclosure relates to the use of radar chips to scan a monitored region such as an enclosed room. The data obtained by the scanning radar chip may be processed to identify targets within the monitored region. The identified targets may be tracked and profiled to indicate their posture such that fall detection rules may be applied and fall events detected.

Certain image processing solutions are available which generate fall alerts using reflections in the target area from fallen objects. However, these image processing solutions do not differentiate between the fall of the subject person and other objects present in the region. For example, the reflected energy from a toilet bowl containing water is similar to that of a fallen person. Consequently, false alerts are generated with the fall of objects present in the room.

There is a need for improved solutions which block fall alerts if the reflected signal is not unusual for that section of the target area by identifying when the reflected signals are anomalous. Thus, further aspects of the present disclosure relate to systems and methods for identifying anomalies in fall detection and filtering fall alerts. Data obtained by the scanning radar chip may be processed to generate current energy profiles within the monitored region. The current energy profiles may be compared with time dependent energy profiles to detect anomalies in the fall events and filtering fall alerts.

Aspects of the present disclosure relate to systems and methods for isolating moving objects in image data. In particular, the disclosure relates to filtering systems for distinguishing data pertaining to stationary and slow-moving objects within image data obtained by a radar chip scanning a monitored region.

The raw data obtained by the scanning radar chip may be passed to a moving body isolation processor which stores each frame of raw data in a buffer memory and applies a temporal filter to identify trackable objects moving within the monitored region.

The system may further enhance the signal to noise ratio of the data and distinguish noise from slowly oscillating targets.

Still further aspects of the present disclosure relate to systems and methods for remote identification of the person (s) using radar-based person identification device. In particular, the disclosure relates to the use of radar chips for extracting a plurality of parameters and analyzing the parameters for generating the identification report. The identification report may be sent to concerned authorities.

As required, detailed embodiments of the present invention are disclosed herein; however, it is to be understood that the disclosed embodiments are merely examples of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

As appropriate, in various embodiments of the disclosure, one or more tasks as described herein may be performed by a data processor, such as a computing platform or distributed computing system for executing a plurality of instructions. Optionally, the data processor includes or accesses a volatile memory for storing instructions, data or the like. Additionally or alternatively, the data processor may access a non-volatile storage, for example, a magnetic hard disk, flash-drive, removable media or the like, for storing instructions and/or data.

It is particularly noted that the systems and methods of the disclosure herein may not be limited in its application to the details of construction and the arrangement of the components or methods set forth in the description or illustrated in the drawings and examples. The systems and methods of the disclosure may be capable of other embodiments, or of being practiced and carried out in various ways and technologies.

Alternative methods and materials similar or equivalent to those described herein may be used in the practice or testing of embodiments of the disclosure. Nevertheless, particular methods and materials are described herein for illustrative purposes only. The materials, methods, and examples are not intended to be necessarily limiting. Accordingly, various embodiments may omit, substitute, or add various procedures or components as appropriate. For instance, the methods may be performed in an order different from described, and various steps may be added, omitted or combined. In addition, aspects and components described with respect to certain embodiments may be combined in various other embodiments.

Reference is now made to FIG. 1 which is a schematic representation of a possible fall detection and alert system 100. The fall detection system 100 includes a radar unit 104, a processor unit 126 and a communication module 134.

The radar unit 104 includes an array of transmitters 106 and receivers 110. The transmitter may include an oscillator 108 connected to at least one transmitter antenna TX or an array of transmitter antennas. 106 Accordingly the transmitter may be configured to produce a beam of electromagnetic radiation, such as microwave radiation or the like, directed towards a monitored region 105 such as an enclosed room or the like. The receiver may include at least one receiving antenna RX or an array of receiver antennas 110 configured and operable to receive electromagnetic waves reflected by objects 102 within the monitored region 105.

The processor unit, 126 which may include modules such as a data filter 123, a tracker module 125, a gait classification module 127 and a fall identification module 129, may be configured to receive data from the radar unit 104 and be operable to generate fall alerts based upon the received data. Where appropriate, a preprocessor 112 may be provided to process the raw data before transferring the data to the processor unit 126, as described herein.

The communication module 134 is configured and operable to communicate the fall alert to third parties 138. Optionally the communication module 134 may be in communication with a computer network 136 such as the internet via which it may communicate alerts to third parties 138 for example via telephones, computers, wearable devices or the like.

It is noted that the system may further include a radar based passive gait speed monitor 127 for use in the subject monitoring station which is schematically represented. The gait speed monitor 127 may be operable to generate a value for the gait speed of a subject passing along an extended target zone 105. The gait speed monitor includes at least one radar scanning arrangement and a processor unit.

The radar scanning arrangement 104 is configured to monitor the movement of a subject 102 over an extended range. The extended range 105 is of dimensions suitable for the measurement of speed of sustained gait along a path of say 4-8 meters. Thus, by way of example, it may be preferred to locate a scanning arrangement to cover movement in a target zone of say 5-6 meters squared.

Where appropriate a single radar scanning arrangement may be used to monitor the entire length of the extended target zone, however where required multiple scanning arrangements may be preferred. The radar typically includes at least one array of radio frequency transmitter antennas and at least one array of radio frequency receiver antennas. The radio frequency transmitter antennas are connected to an oscillator (radio frequency signal source) and are configured and operable to transmit electromagnetic waves towards the target region. The radio frequency receiver antennas are configured to receive electromagnetic waves reflected back from objects within the target region.

The processor unit 126, which may include modules such as a data filter 123, a tracker module 125 and a gait classification module 127, may therefore be configured to receive data from the radar unit and be operable to process the target data by applying gait classification rules and further operable to calculate a gait speed of the subject.

Figure 2:
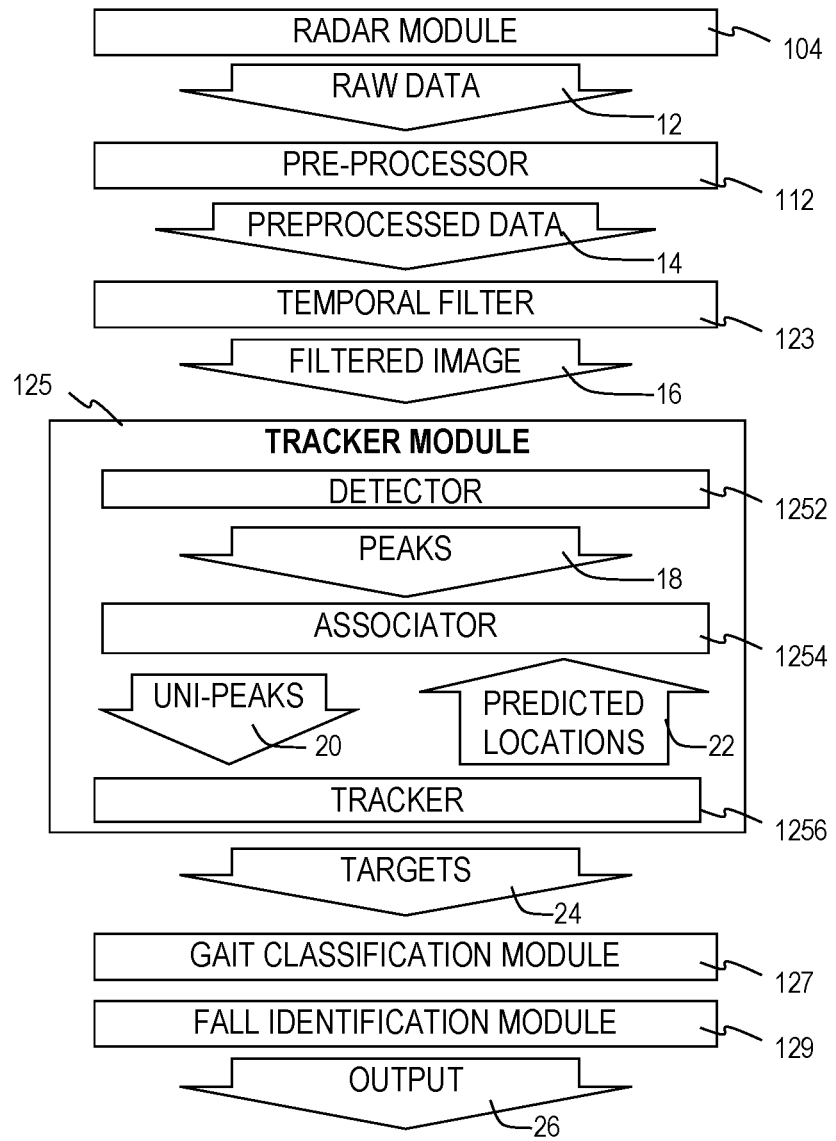
FIG. 2 is a schematic block diagram indicating data flow within a fall detection system.
Figure 7A:
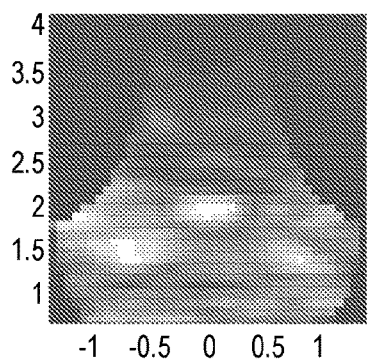
FIG. 7A is an example of an unfiltered frame in spherical coordinates of data collected from the monitored region.

Reference is now made to the block diagram of FIG. 2 indicating possible data flow through the fall detection system 100. Raw data is generated by the radar module 104 which typically includes amplitude values for energy reflected at specific angles and ranges. The raw data 12 may be represented as images in spherical coordinates such as shown in FIG. 7A for example. The preprocessor unit 112 may receive the raw data 12 from the radar module 104. The preprocessor unit 112 include a profile generator 114, a voxel selector 116 and an output 118.

Figure 7B:
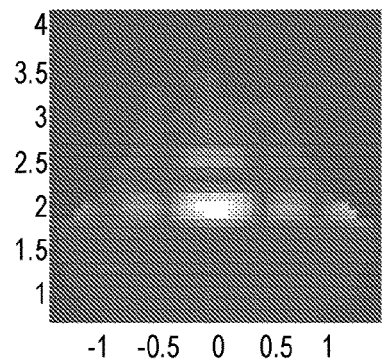
FIG. 7B is an example of a filtered frame in spherical coordinates of data from which static objects have been removed.

The data filter 123 receives the raw data 12 directly from the radar module 104 or alternatively may receive preprocessed data 14 from the preprocessor unit 112. The data filter 123 may include a temporal filter operable to process the raw data 12 in order to remove all data relating to reflections from static objects. The filter 123 may thereby generate a filtered image 16 such as shown in FIG. 7B which includes only data pertaining to moving objects within the monitored region with background removed.

In certain examples, the data filter 123 may include a memory unit, and a microprocessor. Accordingly, the data filter 123 may store in the memory unit both a first set of raw data set from a first frame and a second set of raw data set from a second frame following a time interval. The microprocessor may be operable to subtract the first frame data from the second fame data thereby generating the filtered frame data. Other methods for filtering data will occur to those skilled in the art.

The filtered image data 16 may be transferred to a tracker module 125 operable to process the filtered image data 16 in order to identify moving targets with the data and to track the location of the identified moving targets over time thereby generating target data 24.

Figure 7C:
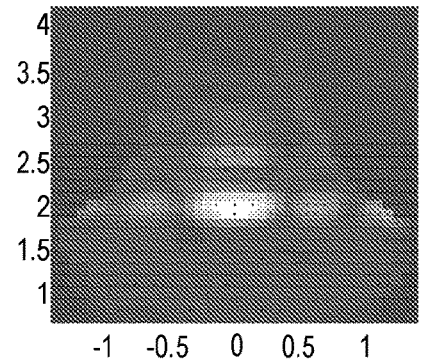
FIG. 7C represents the filtered data in spherical coordinates indicating locations of local maxima.

The tracker module 125 may include a detector 1252, an associator 1254 and a tracker 1256 and is operable to generate data 24 relating to targets within the monitored region. The detector 1252 receives the filtered image data 16 from the temporal filter 123 and processes the filtered image data 16 to detect local maxima peaks 18 within its energy distribution. FIG. 7C shows an example of a filtered data image 16 indicating locations of local maxima peaks.

Figure 7D:
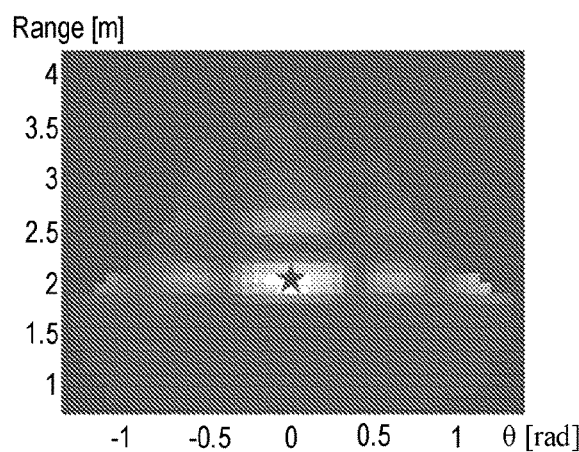
FIG. 7D represents the filtered data in spherical coordinates indicating the location of the strongest local maximum peak.
Figure 7E:
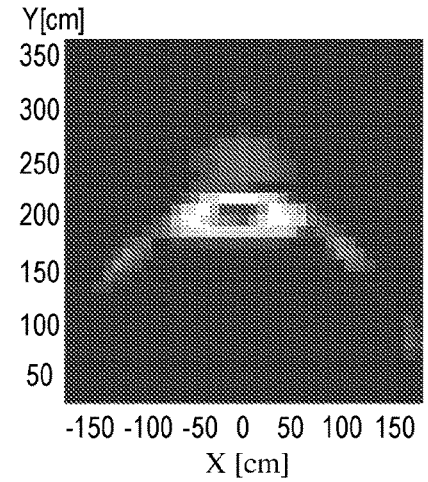
FIG. 7E represents the filtered data transformed into Cartesian coordinates.

The peaks data 18 may be transferred to the associator 1254. The associator 1254 is operable to store the peak data 18 for each frame in a memory element and to associate each peak with a target object and further generating a single measurement location for each target. FIG. 7D represents the filtered data indicating the energy distribution and the location of the measurement in spherical coordinates. Typically the spherical coordinates may be converted into Cartesian coordinates such as shown in FIG. 7E.

Figure 8A:
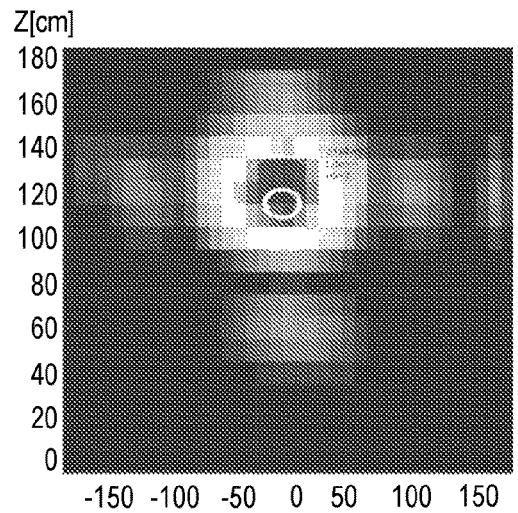
FIGS. 8A and 8B are images indicating the expected and measured locations of a tracked peak in vertical (x-z) and horizontal (x-y) image sections, respectively.
Figure 8B:
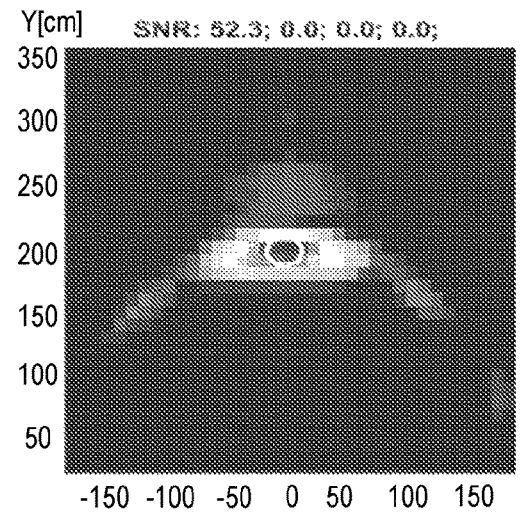

The tracker 125 may be configured to receive target data, or track data, from each frame and be operable to populate a target database, or track database with a location value and a speed value for each target or track in each frame, thereby generating tracking data which may be used to calculate predicted locations 22 for each track in each frame. By way of example, FIGS. 8A and 8B are images indicating the expected and measured track locations in vertical (x-z) and horizontal (x-y) image sections, respectively;

The associator 1254 may be further operable to receive tracking data from a target tracker 1256. Accordingly when a measurement 20 coincides with the expected location of an existing track, the measurement may be associated with that existing target. Alternatively, where the location of the measurement does not coincide with any tracked target, the measurement may be associated with a new track.

Track data 24 may be transferred to a gait classification module 127 and/or a fall identification module 129 operable to process the target data 24 by applying fall detection rules and to generate fall alert outputs 26 where required.

According to some examples, the fall identification module 129 includes a posture detector and a fall detector. The posture detector may be configured to store target data in a memory unit, to generate an energy profile for each target, and to apply posture selection rules thereby selecting a posture for each track. The posture detector may be further operable to store a posture history for each target in the memory unit. The fall detector may then access the posture history from the memory unit and generate a fall alert if at least one track is identified as fallen.

Figure 3:
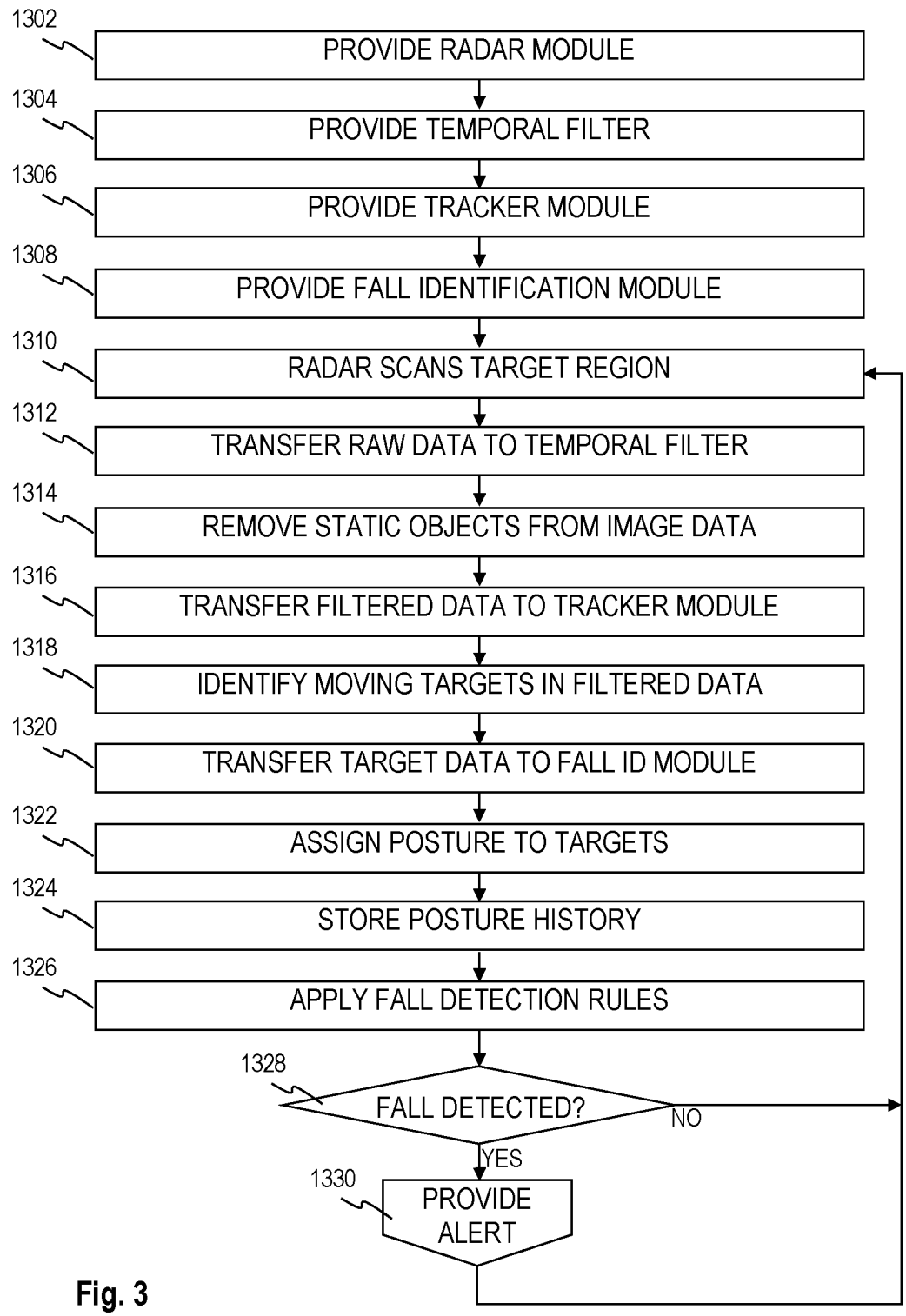
FIG. 3 is a flow chart representing actions of a fall detection method.

Referring now to the flowchart of FIG. 3, a method is taught for fall detection using systems such as described above. The method may include: providing a radar unit 1302 such as described herein, providing at least one processor unit configured to receive raw data from the radar unit and operable to generate fall alerts based upon the received data and providing a communication module configured and operated to communicate a fall alert to third parties. Optionally providing the processor may include providing a temporal filter 1304, providing a tracker module 1306 and providing a fall identification module 1308 such as described above.

The method may further include: the radar scanning the target region 1310, for example by transmitting electromagnetic waves into a monitored region and receiving electromagnetic waves reflected from objects in the monitored region; transferring multiple frames of raw data to the processor unit 1312; removing static objects from the frames of raw data 1314; transferring filtered data to the tracker module 1316, identifying moving targets in filtered data 1318; transferring target data to the fall identification module 1320; tracking the moving targets over time; assigning posture to the targets 1322; storing a posture history in a memory unit 1324; applying fall detection rules 1326; and generating a fall alert 1330 if a fall is detected 1328.

Figure 4:
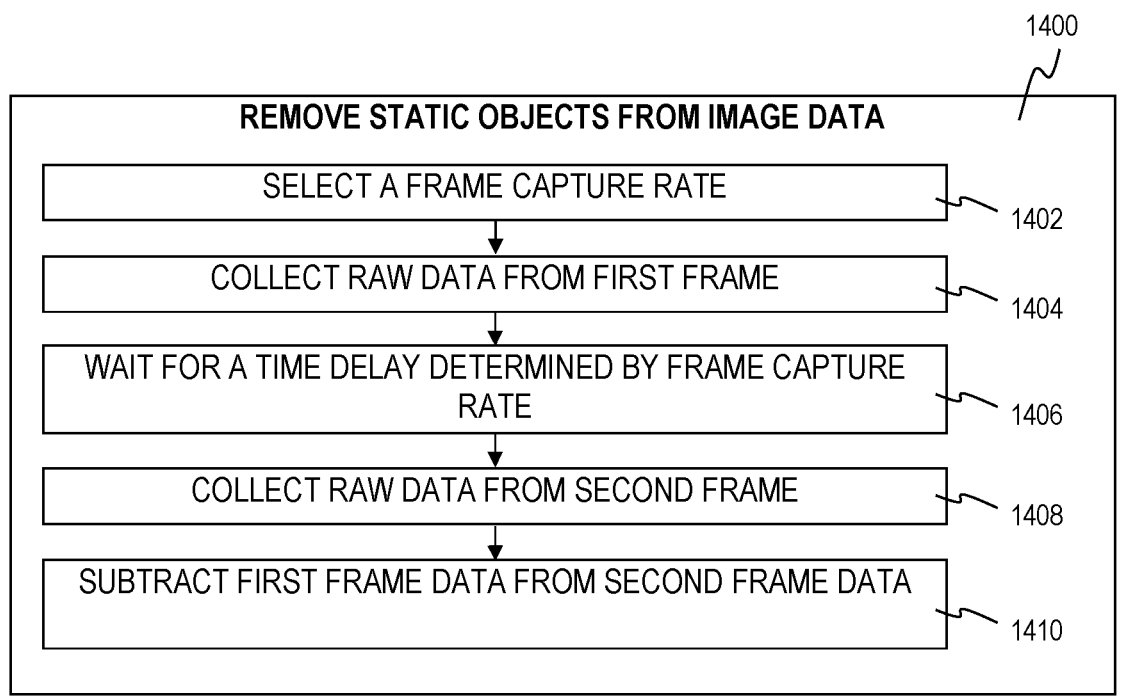
FIG. 4 is a flow chart representing possible actions for removing static objects from image data.

With reference to the flowchart of FIG. 4, which represents possible actions for removing static objects from image data 1400, a temporal filter may be applied to select a frame capture rate 1402, to collect raw data from a first frame 1404; to wait for a time delay, perhaps determined by frame capture rate 1406; to collect raw data from a second frame 1408; and to subtract first frame data from the second frame data 1410. In this way a filtered image may be produced from which static background is removed and the only moving target data remain.

Figure 5:
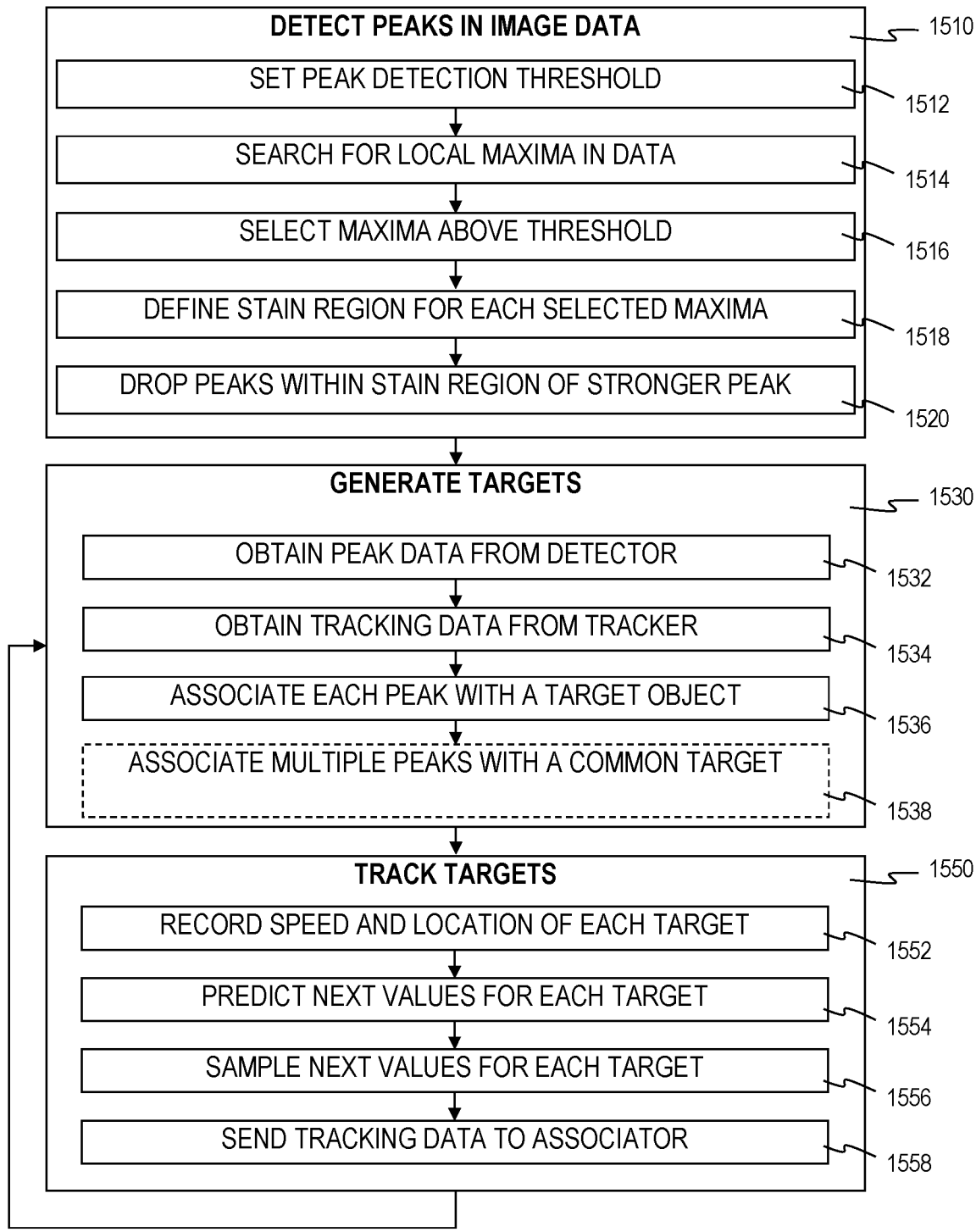
FIG. 5 is a flow chart representing possible actions for generating and tracking targets within data collected from the monitored region.

Referring now to the flowchart of FIG. 5 possible actions are represented for generating 1530 and tracking targets 1550 within data collected from the monitored region.

The method may include detecting local maxima within each frame of filtered data 1510 and associating each local maximum with a target object.

The step of identifying moving targets in filtered data may include: setting a peak detection threshold 1512; detecting local maxima within each frame of filtered data 1514;

defining a stain region, or point refletion spread region, for each of the local maxima 1518; selecting peaks by selecting only local maxima having an amplitude above the peak detection threshold 1516 and which do not lie within the stain region of a larger local maximum 1520.

Peak data may be obtained from the detector 1532 and tracking data may be obtained from the tracker 1534. Accordingly, each selected peak may be associated with a target object 1536. Optionally multiple peaks may be associated with a common target 1538.

Where appropriate, if a peak coincides with the expected location of an existing target the peak may be associated with that existing target. Alternatively, where the location of the peak does not coincide with any tracked target the peak may be associated with a new target.

The moving targets may be tracked over time 1550 by recording in a tracking memory or database a location value for each target in each frame; recording a speed value for each target in each frame 1552; predicting an expected value for a target in each frame 1554; sampling the next values for each target 1556, sending tracking data to associator 1556 and comparing the expected value for each target with the measured value for each target.

Reference is now made to FIGS. 9A-H which show a series of frames of filtered data. The series of frames indicate a moving target within the monitored region which is tracked over time. The tracked target is marked in each frame by a small circle indicating the targets tracked location. It is particularly noted that in FIG. 9G, the target's location is not indicated. Such a scenario may occur for example, when the moving object within the monitored region, which is represented by the target in the data, moves behind a stationary object. The data filter would typically remove the stationary object from the frame, thereby rendering the moving object invisible in the filtered data.

Note that although the object is lost in the filtered data, the associated target is not removed from the tracking database. Rather the missing target is retained and its expected location is calculated for subsequent frames such that when the object peak returns to view such as in FIG. 9H, the peak is again associated with the original target.

Reference is now made to FIGS. 10A-H which show a series of frames of filtered data. The series of frames indicate a moving target which passes through an excluded region within the monitored region, which is marked by a dashed rectangle in each frame. It may be useful to exclude certain regions from the data when, for example, a persistently moving object interfered with data. Such a persistently moving object may be for example a swaying pendulum, a rippling curtain or the like.

Note that when a tracked object passes within the excluded region, such as shown in FIGS. 10D-F, the object is no longer physically monitored but the associated track is not removed from the tracking database. Rather the missing track is retained and its expected location is calculated for subsequent frames such that when the object peak passes out of the excluded region, such as in FIG. 10G, the measurement is again associated with the original target.

Figure 6:
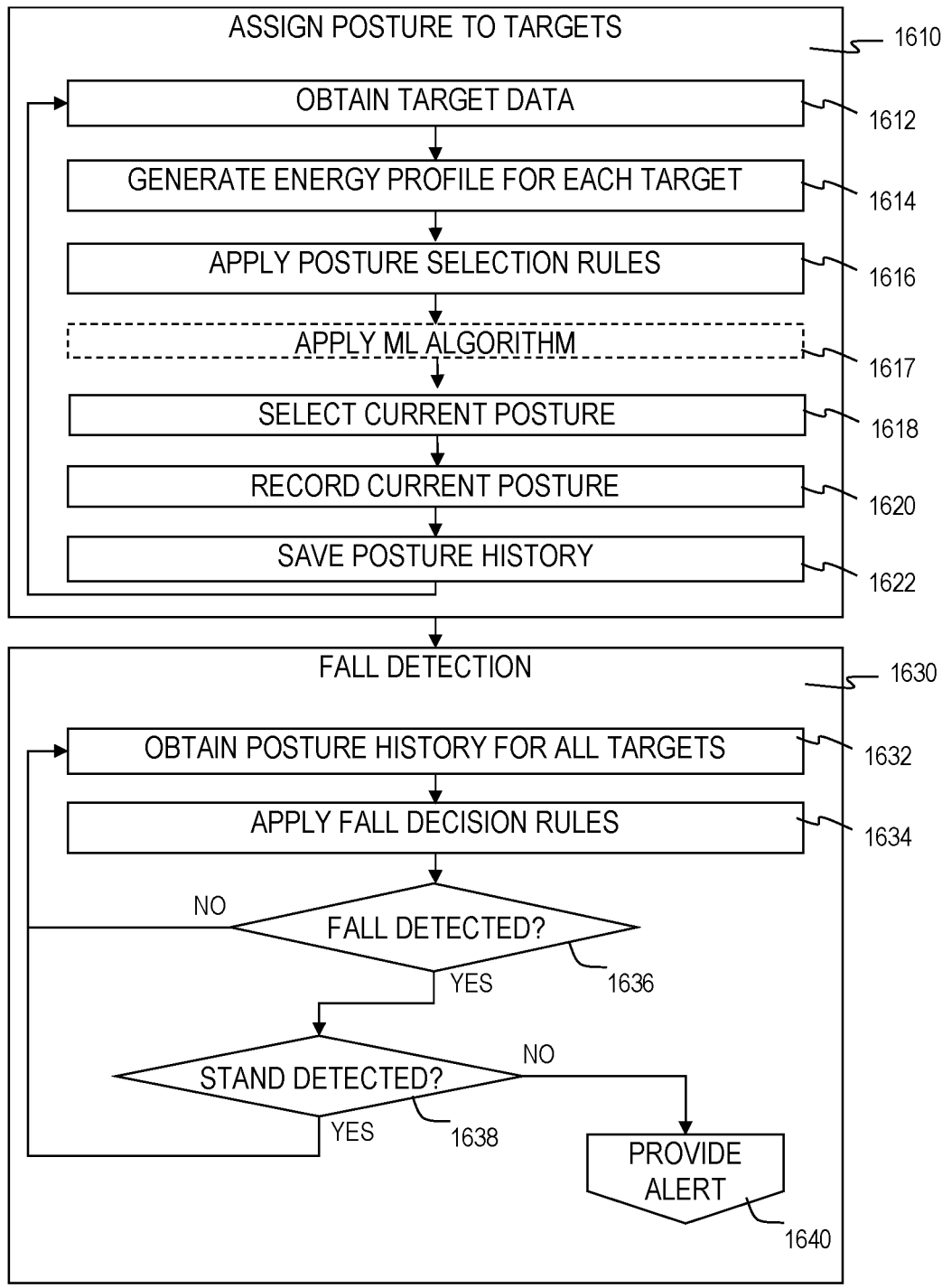
FIG. 6 is a flow chart representing possible actions for detecting fall events within the monitored region.

Referring now to the flowchart of FIG. 6 representing possible actions for detecting fall events within the monitored region, a phase of assigning posture to the targets 1610 may include: obtaining target data 1612; generating energy profile for each target 1614; applying posture selection rules 1616, additionally or alternatively, applying a machine learning algorithm such as a neural network 1617; selecting a current posture 1618; recording current posture 1620 and saving current posture in a posture history 1622

A fall detection phase 1630 may include obtaining the posture history of all targets 1632; applying fall decision rules 1634 and providing an alert 1640 only if a fall is detected in one target 1636 and no other target has been assigned a standing posture 1638.

Figure 11:
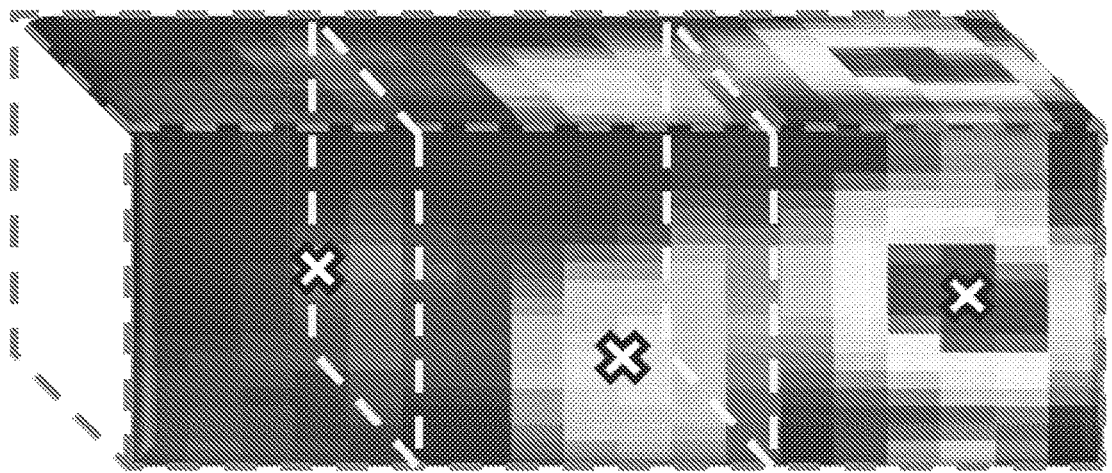
FIG. 11 shows a possible three dimensional energy profile for a target divided into an upper region, a middle region and a lower region.

Referring now to FIG. 11, which shows a possible three dimensional energy profile for a target where appropriate, generating an energy profile for each target includes assigning a first value for amplitude of reflected energy from an upper region or the target; assigning a second value for amplitude of reflected energy from a middle region or the target; and assigning a third value for amplitude of reflected energy from a lower region or the target.

Figure 12A:
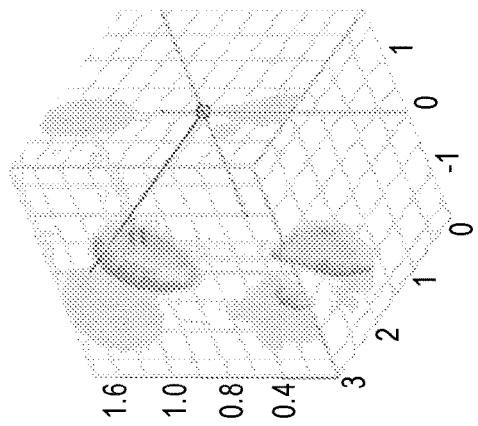
FIG. 12A shows a three dimensional energy profile characteristic of a standing target.
Figure 12B:
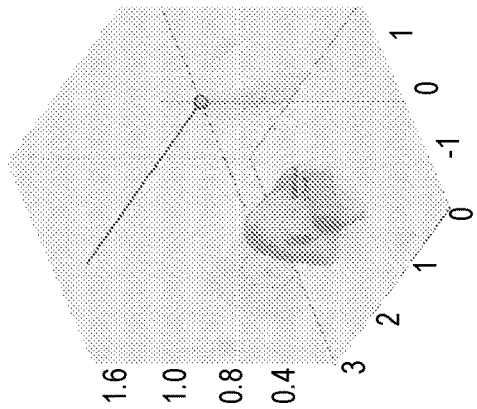
FIG. 12B shows a three dimensional energy profile characteristic of a non-lying target.
Figure 12C:
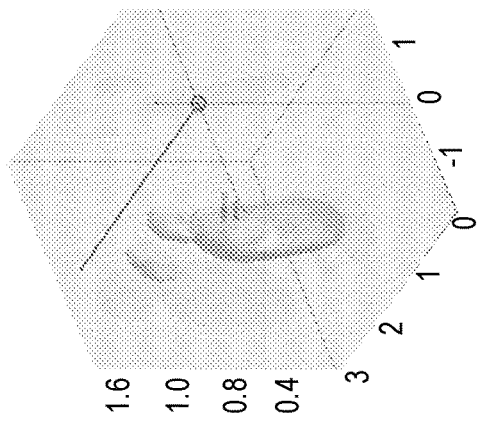
FIG. 12C shows a three dimensional energy profile characteristic of a fallen target.
Figure 12D:
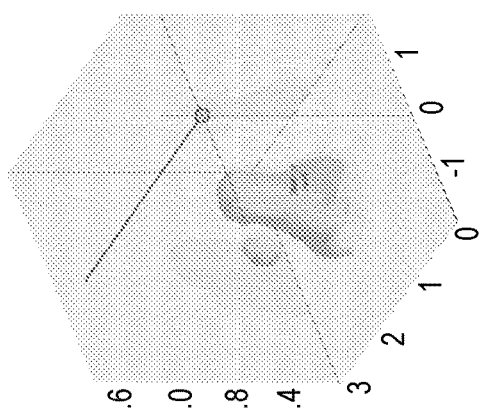
FIG. 12D shows a three dimensional energy profile characteristic of a persistent fallen target.

Characteristic energy profiles may be defined for various postures for example a fallen or lying posture may be identified when the third value for the amplitude is higher than both the first value and the second value such as illustrated in FIGS. 12C and 12D. Such a posture may generate a fall alert.

A standing posture may be identified for example when the first value, second value and third values have similar amplitudes such as shown in FIG. 12A.

A posture may be simply classified as not lying where the third value for the amplitude is not higher than both the first value and the second value such as shown in FIG. 12B.

Referring back now to FIG. 1, the system 100 may further be operable to detect anomalies so as to more accurately detect falls and to generate alerts. Accordingly, the radar unit 104 also includes a pre-processor unit 112 which processes the data received from the receiver 110.

The pre-processor unit 112 includes a profile generator 114 configured to generate energy profiles for a target area. The profile generator 114 generates a set of standard energy profiles 122 and time dependent energy profiles 124 for various segments of the target area. Where appropriate, such energy profiles 122 may be generated in advance and preloaded into the unit, as required. The set of standard energy profiles 122 and time dependent energy profiles 124 are stored in the database 120. The pre-processor unit 112 also includes a segment selector 116 configured to select a target segment of interest in the monitored region 102 by selecting radiations received within a given azimuth range (of the angles measured along the horizontal) at a given depth range measured by the time taken by reflections to arrive at the receiving antennas 110. The profile generator 114 also generates a current energy profile for each target segment of the monitored region 102 selected by the segment selector 116. An output unit 118 sends the standard energy profiles 122 and time dependent energy profiles 124 to the database 120 and the current energy profile of each target segment to the processing unit 126 for anomaly detection and filtering alerts. The output unit 118 is also configured to send the raw data received by the receiver 110 to the processing unit 126. The output unit 118 also sends the selected target segments of interest to the processing unit 126 for anomaly detection.

The processing unit 126 includes a fall detection module 128 which may be configured to receive data from the output unit 118 and operable to generate fall alerts based upon the fall detection rules. The anomalous fall alerts are filtered by an anomaly detection module 130 which may be configured to receive the current energy profile for a selected target segment from the output unit 118 and the set of standard energy profiles 122 and time dependent energy profiles 124 from the database 120. For the selected target segment, the current energy profile is compared with the corresponding time dependent energy profile and anomalous fall alerts are filtered out. An alert generator 132 then generates fall alerts and sends it to the communication devices (not shown) of the intended recipients. The fall alerts may be communicated through a communication network to the recipients on their smartphones, computers, laptops, wearable devices like smart-watch, electronic bands, wearable collar, etc. The communication networks include a Bluetooth network, a Wired LAN, a Wireless LAN, a WiFi Network, a Zigbee Network, a Z-Wave Network or an Ethernet Network. The alert generator 132 may produce alerts in form of a text message, an image, a short video message, vibration signals, a buzzer, a beeper, a bell, a bleeper, a chirper and combinations thereof. The audio/vibration means provided above for generating alerts are exemplary in nature and should not limit the scope of the invention.

Figure 13A:
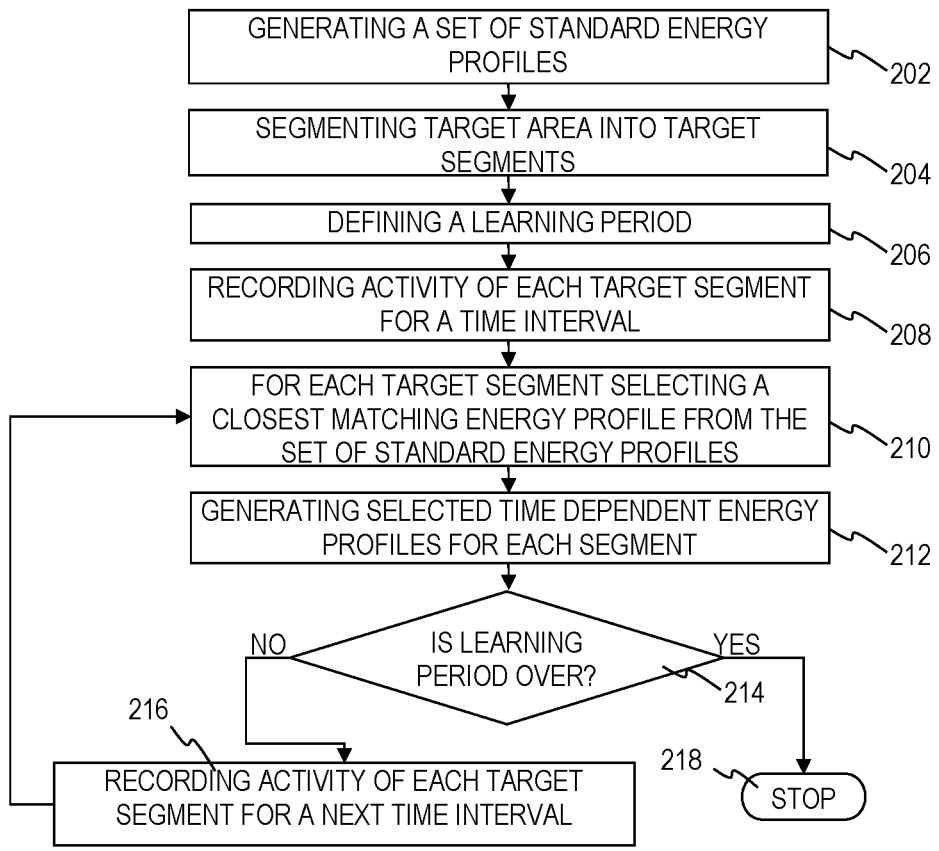
FIG. 13A is a schematic flowchart illustrating an exemplary method for populating a database with time dependent energy profiles according to an aspect of the invention.
Figure 14:
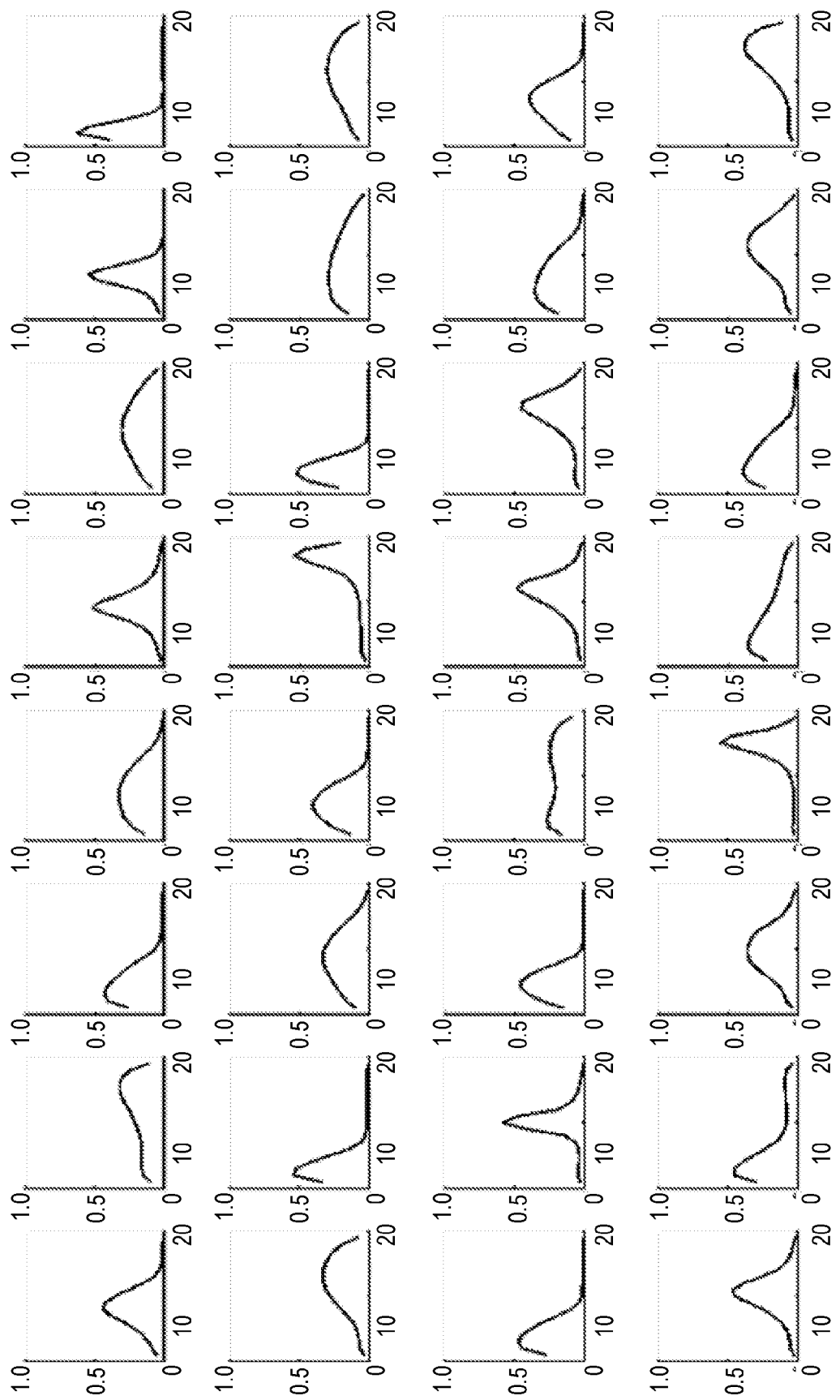
FIG. 14 shows a set of standard energy profiles for a target area.

Referring to FIG. 13A which illustrates an exemplary method for populating a database with time dependent energy profiles. The time dependent energy profile for each section of the target area shows the relative likelihood of each of the set of energy profile being selected at a given time of day. The process starts at step 202 at which a set of standard energy profiles 122 are generated and stored in the database 120. The set of standard energy profiles 122 characterize the expected energy distribution associated with a subject in a different pose (standing, sitting, lying, walking, bending over etc. . . . ). A set of 32 standard energy profiles of an exemplary subject are shown in FIG. 14. These standard energy profiles are generated from large sample of data collected over a large period of time.

At step 204, the target area is segmented into a number of target segments by the segment selector 116. A learning period for collecting time dependent data is defined at step 206. In an exemplary embodiment, a learning period of 48 hours is defined with time intervals of 1 hour. At step 208, for each time interval, activity of each target segment is recorded. The activity is recorded through the reflections received from the target segments by the receiver 110 of the radar unit 104. At step 210, the profile generator 114 selects a closest match for the target segment from the set of standard energy profiles and generates time dependent energy profiles 124 for each segment at step 212. The time dependent energy profiles 124 are stored in the database 120.

At step 214, it is determined if all time intervals of the learning period have been completed. It is noted that the system may continue gathering profiles in an ongoing manner during operation even after the learning period is over. Where required older data may be overwritten or purged. In this manner the previous 48 hours may always be divided into a number of time intervals, such as 24 or twelve time intervals as required.

Figure 15:
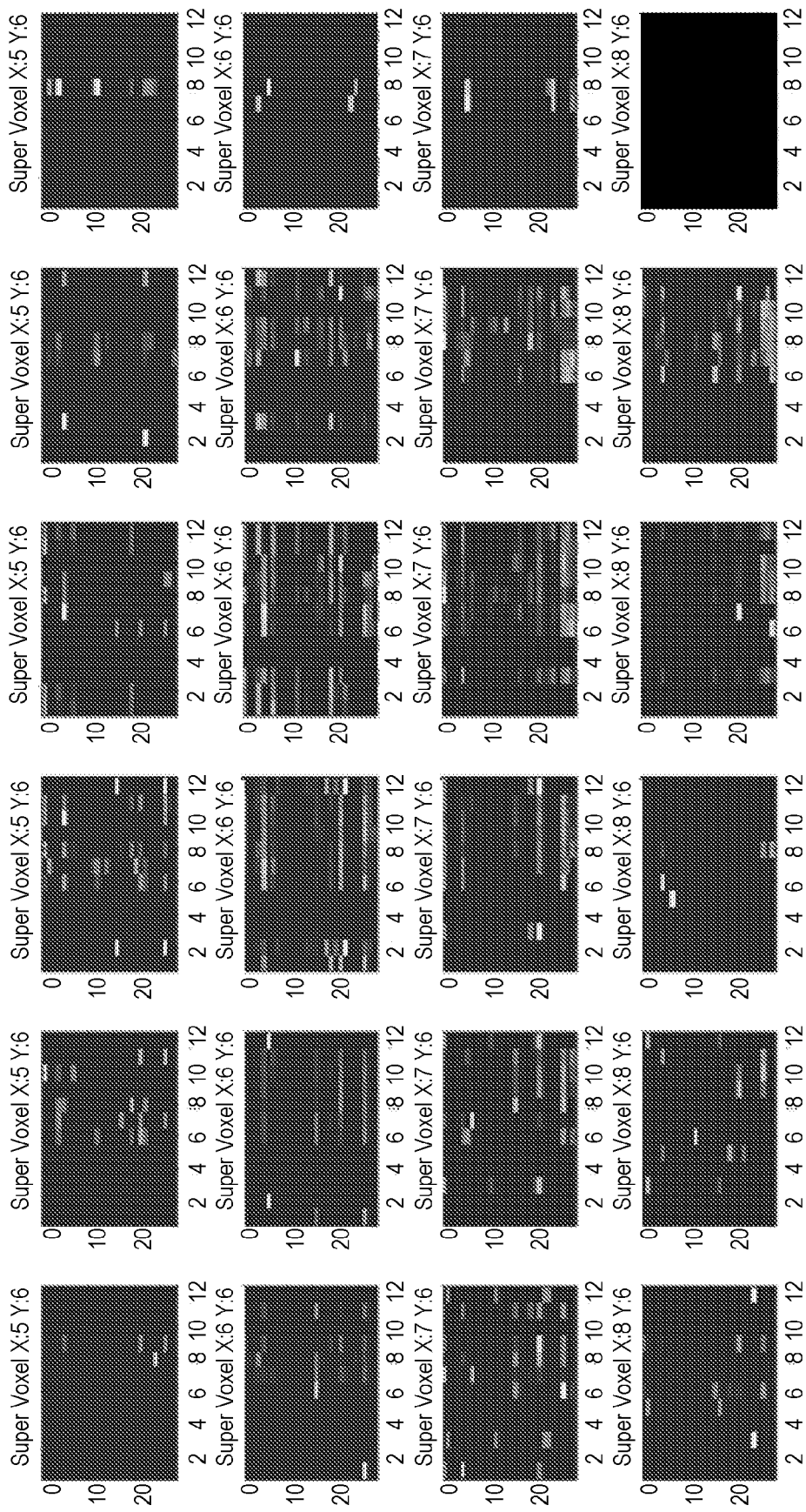
FIG. 15 shows a set of time dependent energy profiles for target segments of a target area.

If "yes", all time intervals of the learning period have been completed, then the process of populating the database 120 with time dependent energy profiles is completed and the process stops at step 218. Else, the activity of each target segment is recorded for the next time interval at step 216 and process repeats from step 210. FIG. 15 shows an exemplary set of time dependent energy profiles 124 for various target segments of a target area. The term "Super Voxel" herein refers to a "target segment" of the target area with 'X' and 'Y' coordinates defining the particular target segment.

Figure 13B:
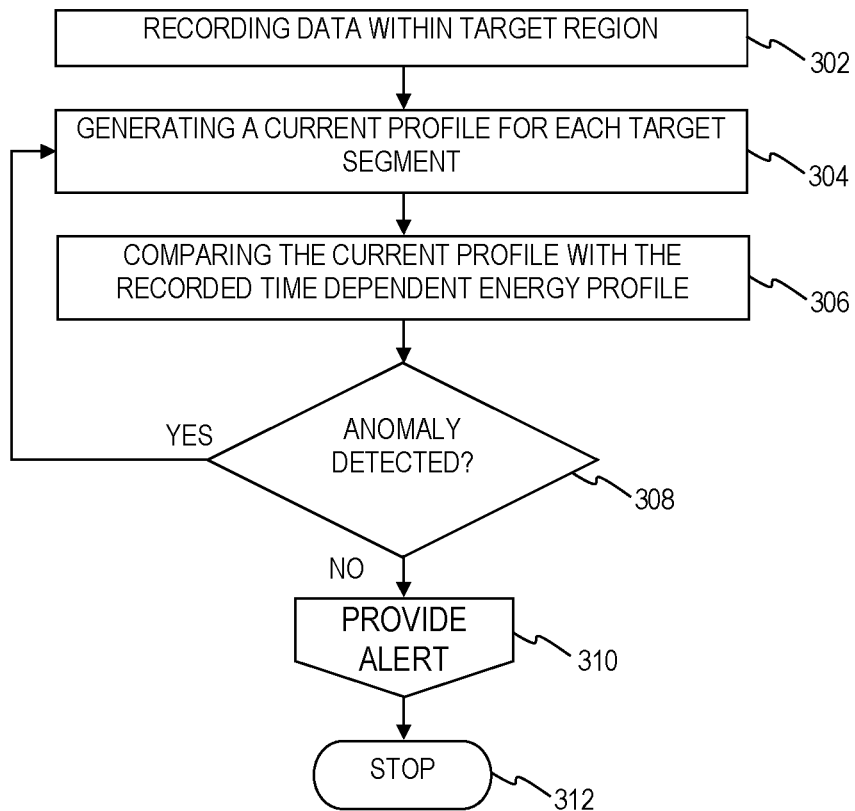
FIG. 13B is a schematic flowchart illustrating an exemplary method for anomaly detection and alert generation according to an aspect of the invention.

Reference is now made to FIG. 13B which is a schematic flowchart illustrating an exemplary method for anomaly detection in fall alerts and alert generation. In case a fall is detected in the target region 102 based on the fall detection rules, at step 302, data corresponding to target region 102 is recorded by the receiver 110 of the radar unit 104. For each target segment of the target area 102, a current energy profile is generated by the profile generator 114 and sent to the processing unit 126 by the output unit 118 at step 304. At step 306, the current energy profile is compared with the recorded time dependent energy profile 124 stored in the database 120. Based on the comparison, it is determined if an anomaly is detected in the fall detection at step 308. In case no anomaly is detected in the fall detection, an alert is generated and provided to the intended recipients through various means at step 310. In case an anomaly is detected in the fall detection, the fall alert if filtered out and process repeats from step 304. The process completes at step 312.

In an exemplary embodiment, the process of anomaly detection in fall alerts is explained using Kullback-Leibler (KL) Divergence which measures how a probability distribution differs from a reference probability distribution. A metric $M^i$ is defined by the KL Divergence as:

$$M^i(P_D^i \parallel P_W^i) = \sum_v P_D^i \log\left(\frac{P_D^i}{P_W^i}\right)$$

where, $P_w^i$ refers to time dependent energy profile distribution of a target segment; and $P_D$ refers to the current energy profile distribution of the target segment.

A threshold T is defined such that if $M^i < T$ there is no anomaly in the fall detection. Consequently, a fall alert is generated and sent to the intended recipients. Otherwise, if $M^i \geq T$ an anomaly is detected in the fall detection the fall detection is filtered out and no alert is generated.

Additionally or alternatively, an anomaly score may also be provided according to the confidence score based on the quality of information in the database and its diversity. A filter mechanism may be provided to perform a decision function base upon parameters such as the anomaly score and the like to further select appropriate alert generation.

It should be clearly understood that the process of anomaly detection in fall alerts explained using Kullback-Leibler (KL) Divergence is exemplary in nature and should not limit the scope of the invention. Any other suitable probability distribution function can be used for the purpose without limiting the scope of the invention.

Figure 16A:
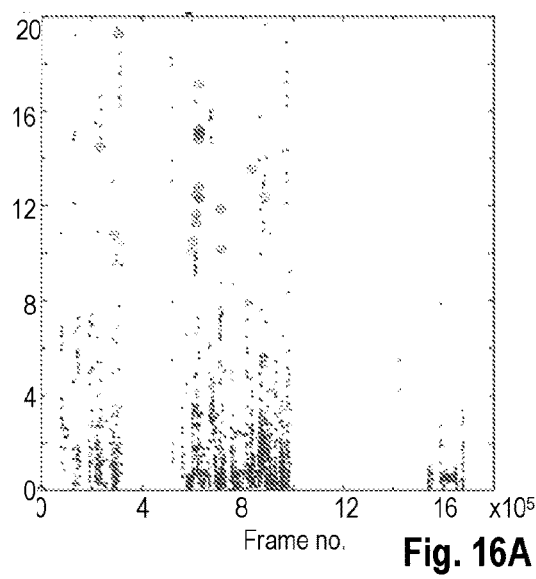
FIGS. 16A, 17A and 18A illustrate KL Divergence values over all time windows in case of normal behaviour in exemplary embodiments of the invention.
Figure 17A:
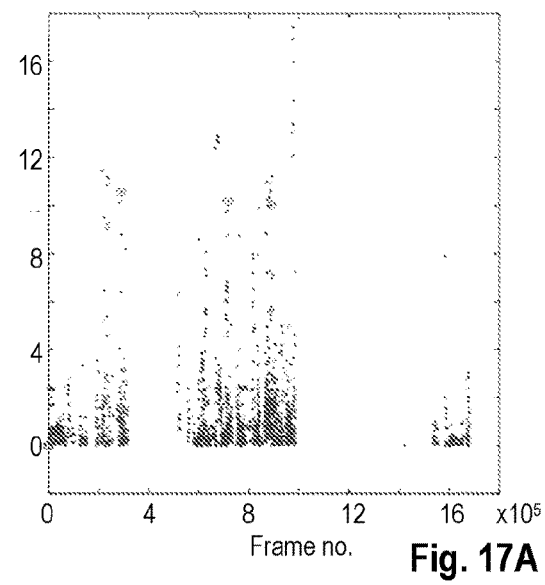
Figure 18A:
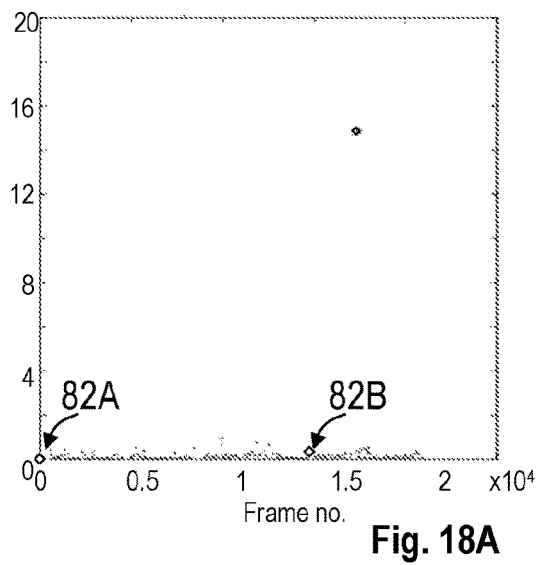

FIGS. 16A, 17A and 18A illustrate KL Divergence values over all time windows in case of normal behavior in exemplary embodiments of the invention.

Figure 16B:
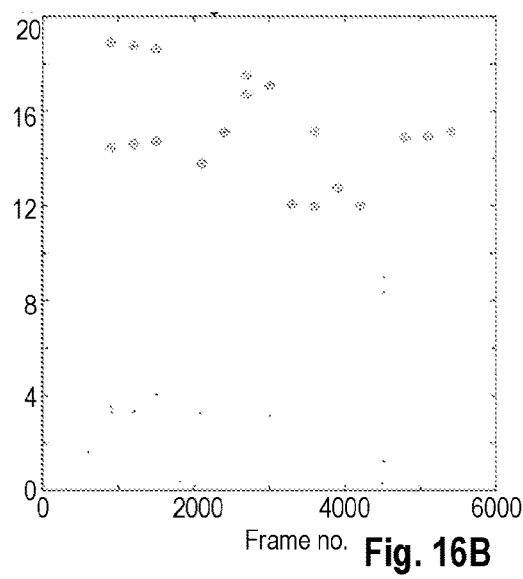
FIGS. 16B, 17B and 18B illustrate KL Divergence values over all time windows in case of actual falls in exemplary embodiments of the invention.
Figure 17B:
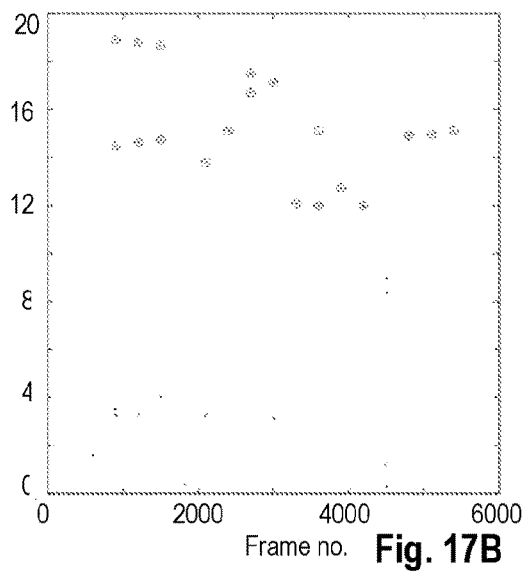
Figure 18B:
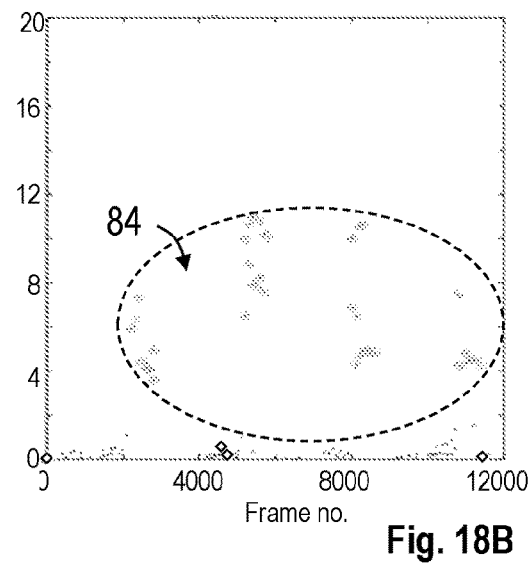

FIGS. 16B, 17B and 18B illustrate KL Divergence values over all time windows in case of actual falls in exemplary embodiments of the invention.

It is noted that the circled points in FIGS. 16A and 17A represent anomalies detected which do not correspond to actual falls. Such anomalies would not typically result in an alert being generated as they would not be accompanied by a fall detection event.

It is noted that the circled points in FIGS. 16B and 17B represent anomalies detected which correspond to actual falls. Such anomalies would typically be accompanied by a fall detection event and would therefore generate a fall alert.

FIGS. 16A and 16B represent divergence values recorded before the learning period was completed. By contrast, FIGS. 17A and 17B represent divergence values recorded after a learning period has been completed. Consequently, more events are recorded as anomalous in FIG. 16A than in 17A although both these represent normal behavior.

Referring now to FIG. 18A, which shows KL divergence where no actual falls occur, it will be noted that although a number of fall detection events are recorded, as are circled in green, no corresponding anomaly was detected. Thus, false positives are avoided.

By contrast, in FIG. 18B, where actual falls do occur, these generated fall detection events and are circled in green, it is noted that the events also correspond to anomalies. Accordingly, the fall detection alert is generated.

The systems and methods explained above provide an improvement to fall detection methodology by avoiding false positives.

Further features of the system include the capability to retain a long-term memory for rare events, such as the operation of a washing machine or the like, which may otherwise be considered anomalies if only a 48 hour slice of memory is considered.

It is further noted that the system may classify zones within the target regions based upon the time dependent profiles. For example a zone may be identified to be a bed, if, say, a lying posture is detected over a long time mainly during night hours, or a toilet if, say, sitting and/or standing profiles are detected for characteristic short periods and so on. Such a classification system may form a basis for advanced room learning.

Referring back now to FIG. 1 is noted that the communication module 134 may further be configured to communicate with an event detection module, optionally via the computer network. The event detection may include a machine learning system such as a neural network 140 operable to generate a fall likelihood score. In particular examples the neural network may be provided by the processor inputs such as from height profiles, signal-to-noise ratio and radial distance to target and the like as well as combinations thereof.

Figure 18C:
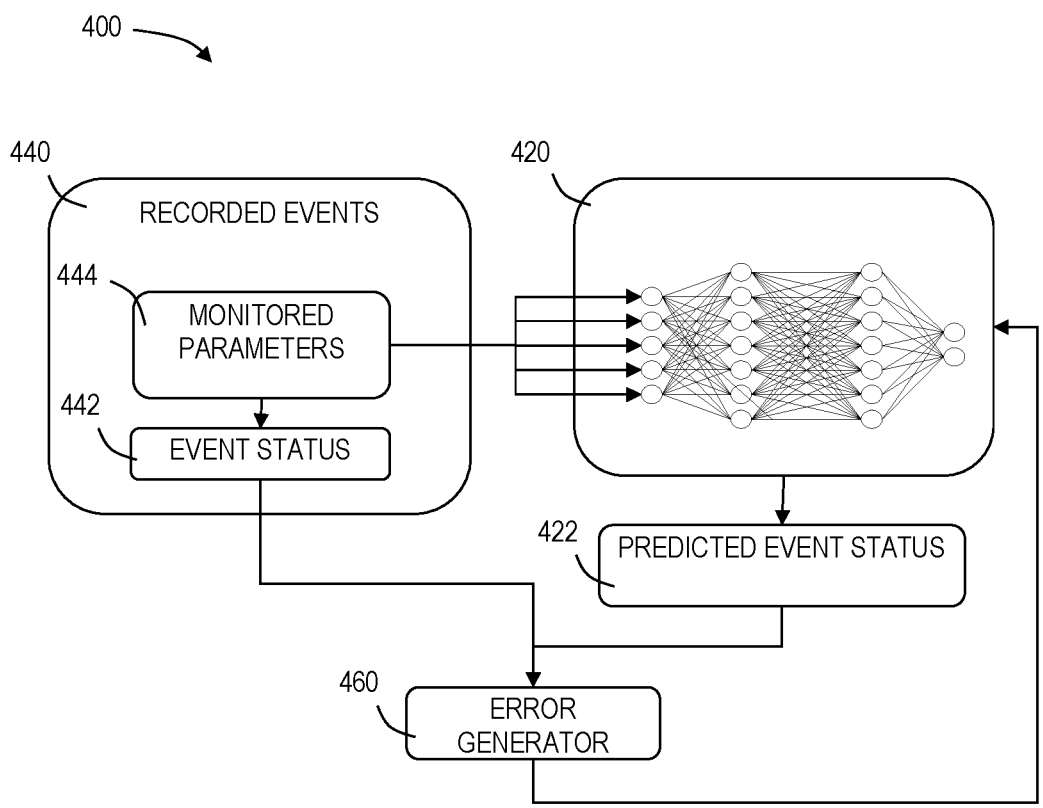
FIG. 18C is a block diagram of a training system for generating a fall likelihood score using supervised learning.

Reference is now made to the block diagram of FIG. 18C, representing the main components of a possible training system 400 for generating a fall likelihood score using supervised learning. Such a training system 400 is presented by way of illustration and may be used during set up.

Various models maybe used such as neural networks, non-linear models, network regression models, networks of sigmoid function neurons and the like. For the purposes of illustration, a neural network is described herein in however, other models and training systems will occur to those skilled in the art.

In particular, it has been found that a Long Short Term Memory recurrent neural network architecture may be particularly suitable for real time evaluation of fall events as it is relatively easy to implement if it is configured to monitor transitions between height profiles for example. It will of course be appreciated that other architectures such as CNN may be preferred, as appropriate.

The training system 400, of the example includes a neural network 420 a real patient record 440 and an error generator 460. Recorded events may be monitored during a training phase, for example within a test environment in which known fall events occur, such that the actual event status 442 is known, for example whether a fall has occurred or a subject is lying down, or the like. Similarly, the neural network generates a predicted even status 422. The Error generator 460 compares the actual event status 442 and the predicted event status 422 producing a cost function which is fed back to the neural network which optimizes the various neuron parameters so as to minimize the cost function, possibly using iterative techniques or heuristic techniques.

By way of example a cost function may be generated by a controller summing the squares of the errors for each input, although other cost functions may be preferred as suit requirements.

Having generated a cost function, the controller may adjust the neuron parameters so as to minimize the cost function. Minimization algorithms may include, but are not limited to heuristic methods such as Memetic algorithms, Differential evolution, Evolutionary algorithms, Dynamic relaxation, Genetic algorithms, Hill climbing with random restart, Nelder-Mead simplicial heuristic: A popular heuristic for approximate minimization (without calling gradients), Particle swarm optimization, Gravitational search algorithm, Artificial bee colony optimization, Simulated annealing, Stochastic tunneling, Tabu search, Reactive Search Optimization (RSO) or the like. Additionally or alternatively, minimization may include iterative methods such as Newton's method, Sequential quadratic programming, interior point methods, Coordinate descent methods, Conjugate gradient methods, Gradient descent, Subgradient methods, Bundle method of descent, Ellipsoid methods, Reduced gradient method, Quasi-Newton methods, Simultaneous perturbation stochastic approximation (SPSA) method for stochastic optimization, Interpolation methods and the like.

It is a particular feature of the training system 400 that the recorded events provide real subject parameters 444 to the neural network, such that the neural network is optimized to produce a predicted diagnosis 422 as close as possible to the actual event status 442 of the real patient record for any given set of subject parameters.

Accordingly, once trained the neural network 420 is able to generate a fall likelihood score according to the monitored parameters such as height profile, signal to noise ratio, distance to the subject or the like. It is further noted that, where required, other input parameters may be provided such as body volume, body mass, gait speed, breathing rate, heart rate, heart rate variability, activity of daily living, body temperature, blood pressure and the like as suit requirements.

The fall likelihood score may be represented by a percentage value indicating the degree of confidence that a fall event has occurred.

Figure 18D:
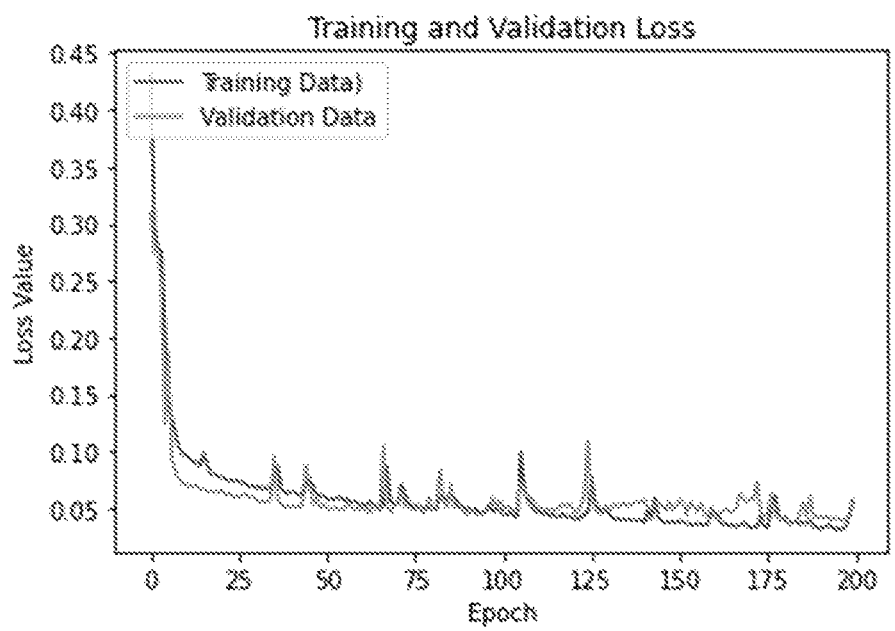
FIG. 18D is a graph indicating changes over time of false positive and false negative records.

FIG. 18D is a graph indicating how the rate of false positives and false negative status records (Loss Value) changes over time. The decreased rate indicates that the system is able to learn to successfully identify false events both during the training data as well as during blind tests with validation data.

It will be appreciated that the Machine Learning event detection module may allow a single network to validate events in multiple situations, for example fall from standing, fall from wheelchair, a subject rising after a fall, a subject falling from bed, a subject getting out of bed and the like.

Figure 19A:
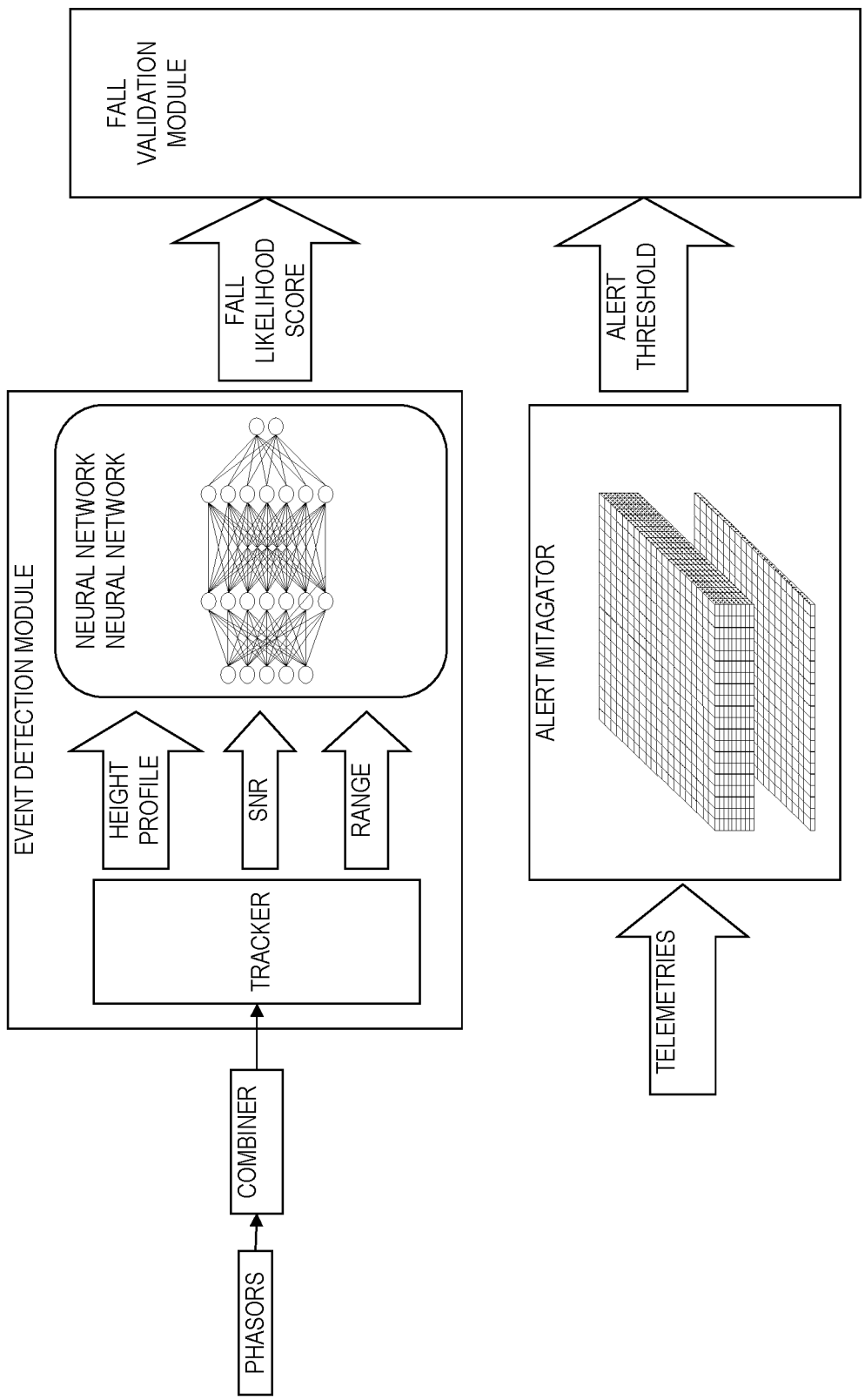
FIG. 19A is a block diagram schematically representing selected components of a fall alert generator.

Referring now to the block diagram of FIG. 19A, selected components of a fall alert generator are represented. The fall alert generator includes an event detection module, an alert mitigator and a fall validation module. The event detection is configured to receive input from a radar-based monitor and to generate a fall likelihood score. The alert mitigator is configured to receive input from a telemetric system and to generate an alert threshold using sensitivity maps representing the monitored region.

The alert threshold may present a dynamic value for a minimum certainty required before an alert is generated. The fall validation module is configured to compare fall likelihood score from the event detection module with the alert threshold from the alert mitigator. If the percentage value of the fall likelihood score is higher than the alert threshold, then a fall alert may be generated.

Figure 19B:
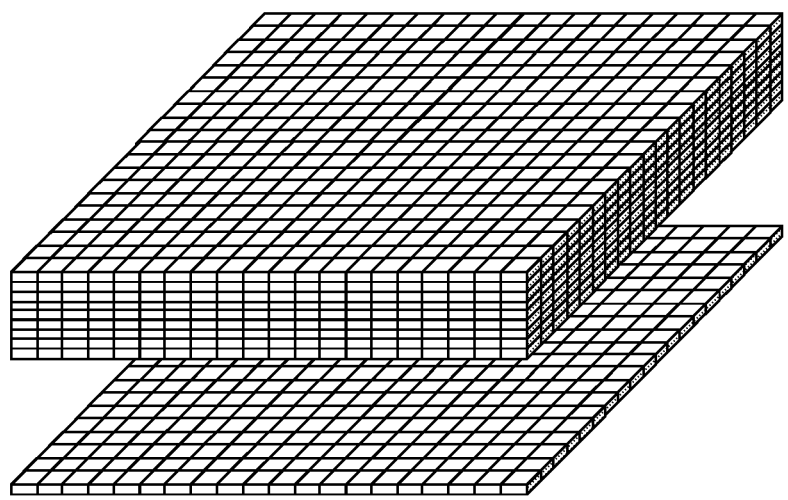
FIGS. 19B and 19C, schematically indicate a sensitivity map which may be used by the fall validation module.
Figure 19C:
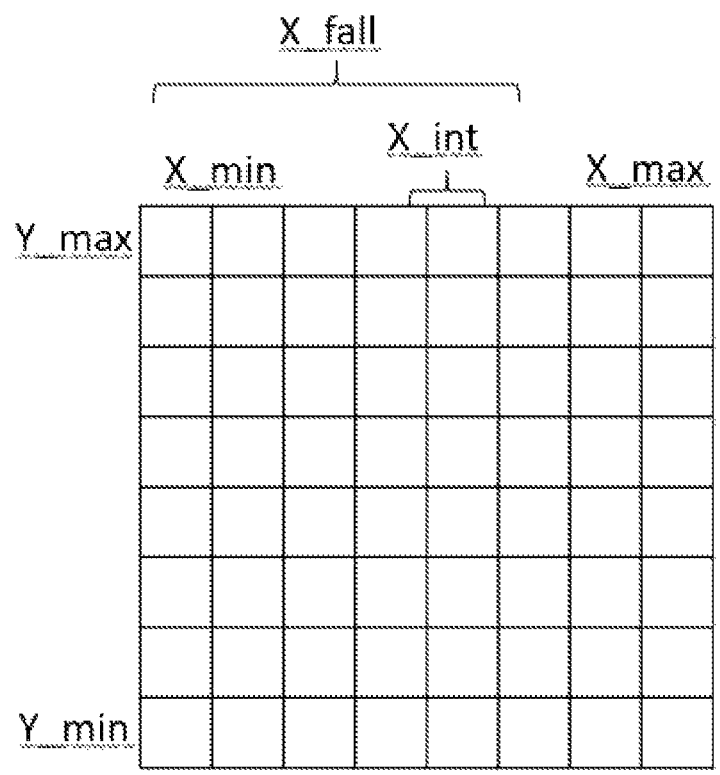

With specific reference to FIGS. 19B and 19C, which schematically indicate a sensitivity map which may be used by the fall validation module. Each sensitivity map may be a binary file comprising a stack of two-dimensional arrays, for example a stack of ten 20 by 20 matrix layers.

As shown in FIG. 19C, each 20 by 20 matrix layer may array X values by dividing the array into equal intervals, X_INT from a minimum value X_MIN to a maximum value X_MAX and divide such that:

$$X\_INT=(X\_MAX-X\_MIN)/20$$

Accordingly, a single matrix layer may be used to set the fall detection sensitivity with other layers possibly used for other room mapping such as target detection sensitivity for example. A position to region mapping function may provide a map index as:

$$\text{MapInd}X=(X\_\text{fall}-X\_\text{min})/X\_\text{int}$$

Fall probability maps may allow the alert threshold to be adapted according to the position of the alert within the room as well as the historical data for that room. By way of example, various sensitivity maps are illustrated in:

FIG. 19D which indicates an example of a sensitivity map for a transition from lying to bending, FIG. 19E which indicates an example of a sensitivity map for a transition from lying to standing, FIG. 19F which indicates an example of a sensitivity map for no transitions following a fall, and FIG. 19G which indicates an example of a sensitivity map for a transition from standing to lying characteristic of a fall.

Figure 20:
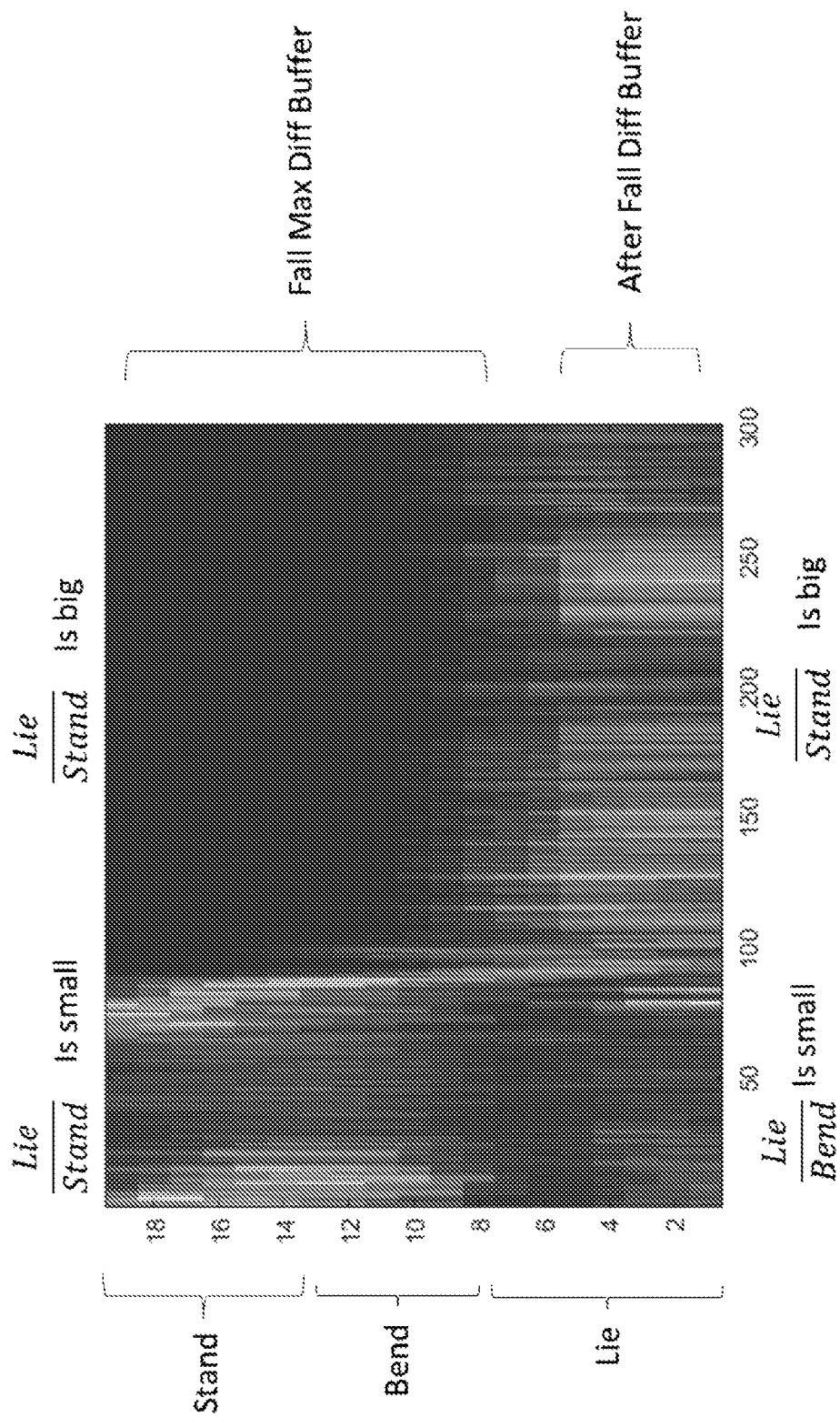
FIG. 20 is a graph illustrating how the height profile input might change over time during a possible fall event.

FIG. 20 indicates a possible height profile input parameter which may be input into the event detection module, The intensity of the reflected energy from each of 20 height strata is indicated for consecutive frames at a given coordinate. In the example it may be seen that during the first 80 to 100 frames, a lot of energy is reflected from height strata 9 to 20, during the subsequent frames most of the energy is reflected at height strata below 6. This indicates a rapid transition between a standing posture to a lying posture during frames 80 to 100. Such a transition may be indicative of a fall. Other parameters may be used as inputs such as signal to noise ratio of the frame as well as the radial distance to the reflected signal.

Figure 21:
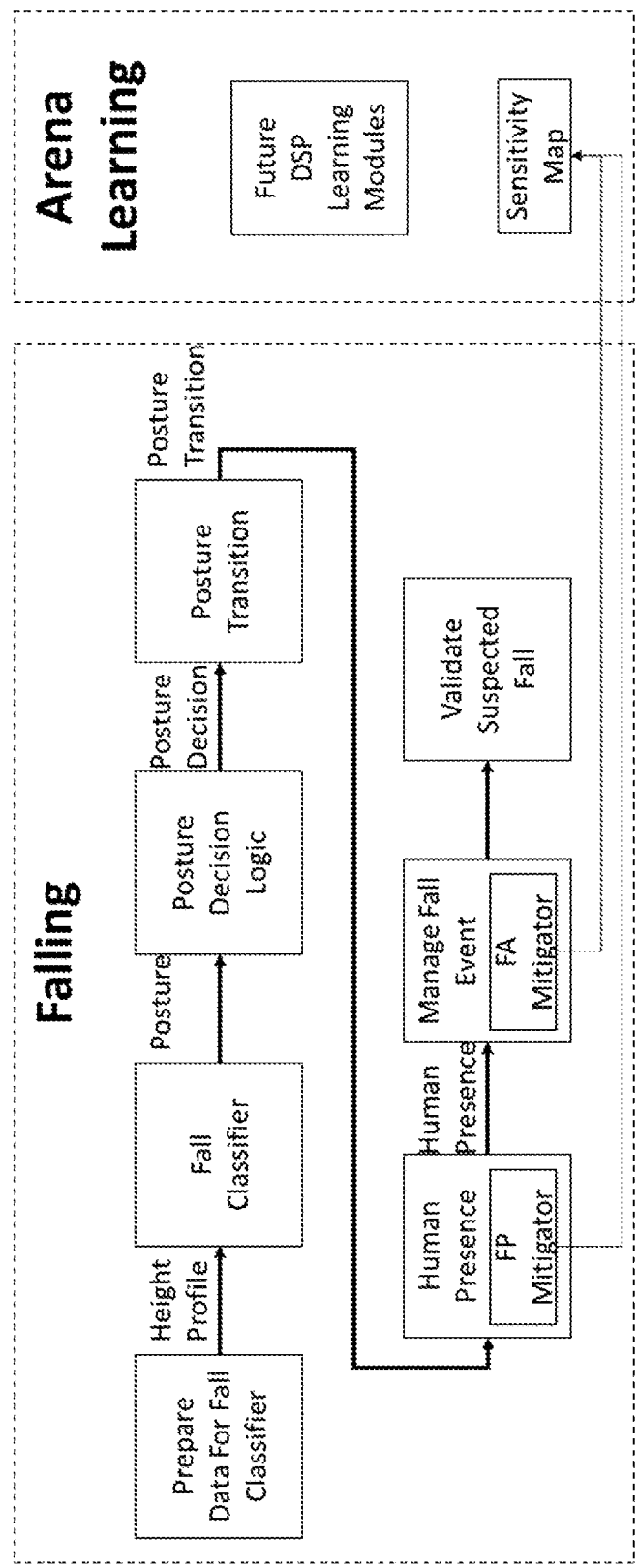
FIG. 21 is a block diagram illustrating how various elements of the system may relate to each other.

With reference to the block diagram of FIG. 21, it is noted that fall detection may be effected by preparing data for a fall classifier, such data is typically gathered by a radar based monitor such as described herein. The data may include height profiles of targets within the monitored region, as well as the distance of targets from the detector, which are input to a fall classifier which may determine a current posture for the subject, the current posture may be input to a posture decision function which provides a posture decision output confirming the posture status of the subject. The posture status may be input into a posture transition function for determining whether a posture transition event has occurred. Posture transition events may serve as inputs to a Long Short Term Memory recurrent neural network for example.

A human presence monitor may further mitigate fall alerts by detecting if a human is present at the time of a posture transition. Human presence may be determined according to a sensitivity map provided by a machine learning module configured to characterize the monitored region. It is noted that this may require the addition of a further sensitivity layer where required.

The obtained inputs may be provided to a Fall Event Manager unit which further mitigate fall alert generation using the sensitivity map. Accordingly, a suspected fall may be validated or invalidated as appropriate.

Figure 22:
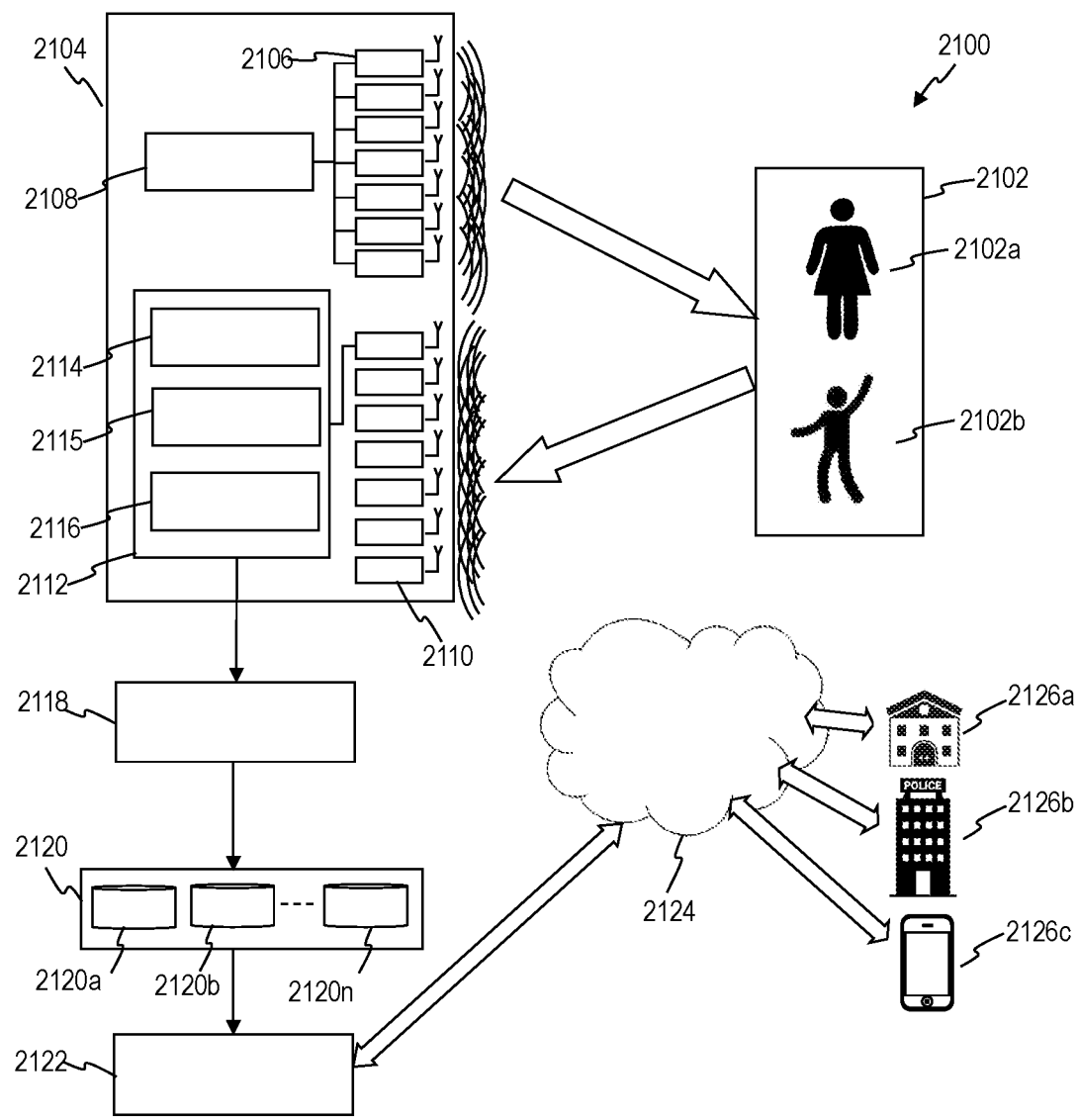
FIG. 22 illustrates a schematic representation of a system for remote identification of people using radar-based person identification device.

Reference is now made to FIG. 22, which is a schematic representation of a system 2100 for remote identification of person(s). The system 2100 includes a radar-based person identification device 2104, a processing unit 2118, a database 2120 and a communicator 2122.

The radar-based person identification device 2104 includes an array of transmitters 2106 and an array of receivers 2110. The array of transmitters 2106 may include an oscillator 2108 connected to at least one transmitter antenna or an array of transmitter antennas. Accordingly, the transmitters 2106 may be configured to produce a beam of electromagnetic radiations, such as microwave radiation or the like, directed towards a monitored region 2102 such as an enclosed room or an open area. The receiver 2110 may include an array of receiver antennas configured and operable to receive electromagnetic waves reflected by objects within the monitored region 2102. The monitored region 2102 is shown to include two persons 2102a and 2102b standing in different postures. However, monitored region 2102 may include a smaller area focusing only one person or a larger area focusing more people for measuring their physical parameters without limiting the scope of the invention.

In a particular embodiment, the person identification device 2104 monitors the persons 2102a and 2102b without any physical contact or attachments. The person identification device 2104 may be appropriately positioned at a distance of few feet from the monitored region 2102 to effectively monitor the persons 2102a and 2102b. In one embodiment, the person identification device 2104 is positioned at any location of various premises. Premises can include such as but are not limited to a residential building, a lift area, an entrance of the premise, a school, a hospital, a guest visiting area, a reception, an office, a mall, and so on. The person identification device 2104 can be located anywhere inside or outside of the geographic boundary of the monitored region like walls or ceilings of the premises.

The information received by the receiver 2110 of the person identification device 2104 includes the position, shape and motion parameters of the persons 2102a and 2102b. The parameters which may be monitored may include, but not limited to, height, weight, body volume, body shape, body structure, orientation, various postures of standing, sitting, lying down, style of walking, running, velocity, acceleration, etc.

Figure 26:
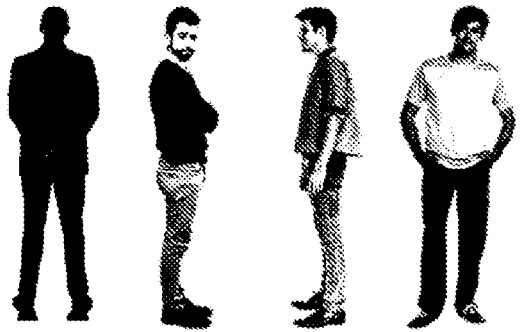
FIG. 26 illustrates different orientations of the person(s) for identification through the radar-based person identification device according to an aspect of the invention.
Figure 25A:
FIGS. 25A-25E illustrate different postures of the person(s) for identification through the radar-based person identification device according to an aspect of the invention.
Figure 25D:
Figure 25B:
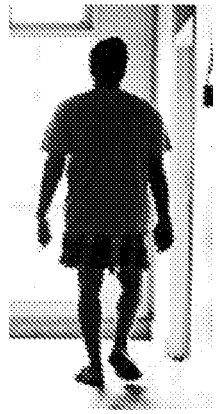
Figure 25C:
Figure 25E:
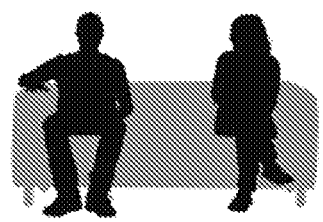

The electromagnetic signals received by the receiver 2110 are sent to a pre-processing unit 2112 of the person identification device 2104. The pre-processing unit 2112 comprises a position characteristic extraction module 2114, and shape extraction module 2115 which extracts characteristics of different positions of the persons 2102a and 2102b. Different persons can stand in different positions such as erect, slanting, free style, cross-armed, facing towards the person identification device 2104, facing back towards the person identification device 2104, and so on as shown in FIG. 26.

Figure 23:
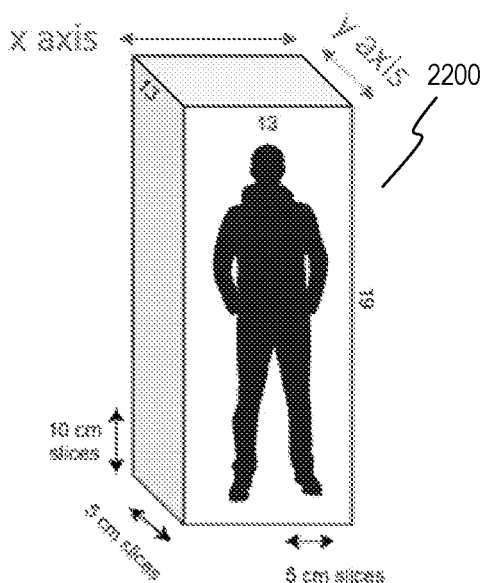
FIG. 23 illustrates a schematic representation of a box created aroud a target person for extracting the position characteristics according to an aspect of the invention.
Figure 24:
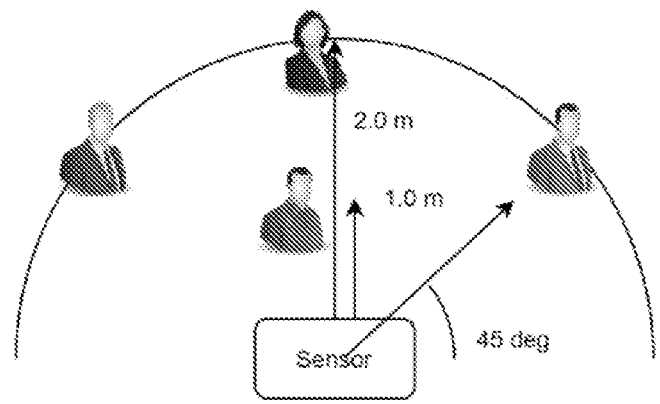
FIG. 24 illustrates different locations of persons for identification through the radar-based person identification device according to an aspect of the invention.

In some embodiments, the position characteristic extraction module 2114 filters out the non-desired signals received from other objects (not shown) present in the monitored region 2102. The position characteristic extraction module 2114 can also extract position characteristics of the persons considering their distance from the person identification device 2104. For example, one person can be at a location of just 1 meter from device 2104 while the other person can stand a little far away (e.g. 2 meters) from the device 2104 as shown FIG. 3. In another instance, the position characteristic extraction module 2114 extracts the characteristics of the position considering the angle of orientation of the person from the device 2104. The position characteristic extraction module 2114 generates a boundary or a box 2200 around the target person as shown in FIG. 23. The creation of box around the person helps to gauge the physical features of the person including the height and physical width of the person in a particular position of standing or sitting. In a particular embodiment of the invention, the box can be partitioned into various small sized slices along the 3-axis to determine the physical characteristics of the person more accurately. The accuracy of determining the physical characteristics increases in proportion to the number of slices of the box. In a preferred embodiment of the invention, the position characteristic extraction module 2114 generates 19 position profile features of the target person.

The pre-processing unit 2112 also comprises a motion characteristic extraction module 2116 which is configured to extract the motion characteristics of the persons 2102a and 2102b from the received electromagnetic signals. The motion characteristics may include, but not limited to, rate of acceleration and velocity, trajectory of the motion, erect back of the person while walking, bent during walking, looking forward while walking, and so on. In a preferred embodiment of the invention, the motion characteristic extraction module 2116 generates 11 dynamic profile features of the target person.

It is further noted that other characteristic movements may be detected and extracted, which may not directly related to position may be monitored, such as head movements, shaking hands, or during locomotion, step size, step rate, symmetry of steps, limping, left or right leading leg and the like as well as combinations thereof. Such movements may also provide data for a dynamic profile features of the target person.

Moreover, the preprocessing unit 2112 may be further configured and operable to extract characteristic shape characteristics of a target person.

FIGS. 25A-25E present for purely illustrative purposes various exemplary positions of the persons which can be identified using the person identification device 2104 in accordance with an embodiment of the invention. For example, the person's identification device is configured to identify person based on any type of posture, for example, sitting and talking in a chair (FIG. 25A), walking (FIG. 25B), sitting on a chair (FIG. 25C), lying down (FIG. 25D), sitting in different styles on a sofa (free style or cross-legged) (FIG. 25E), and so on. It will be appreciated that many other positions may also be adopted by persons.

The position, shape and motion characteristics of the persons 2102a and 2102b generated by the modules 2114, 2115 and 2116, respectively are sent to the processing unit 118. The processing unit 118 is configured to generate position and motion vectors along the 3-axis as well as shape vectors based on the extracted characteristics of the persons 2102a and 2102b. The processing unit 2118 is also configured to generate physiological profiles of the persons based on parameters including such as but not limited to gender, weight, age, body shape, height, and so on.

The processing unit 2118 generates a probabilistic identification of the person by applying the stored Artificial Intelligence (AI) algorithms on the position and motion characteristics and the physiological parameters of the person. The probabilistic identification is then used to generate an identification profile of the person.

In some embodiments, the processing unit 2118 is configured for manual or automated training through machine learning to enhance the stored probabilistic algorithms for person identification. It may use methods from neural networks, statistics, operations research and physics to find hidden insights in the received data of position and motion characteristics without being explicitly programmed for it. The processing unit 2118 may be trained "on the fly" to build probabilistic models based on a training data. The generated probabilistic models may be trained, tested and validated at regular intervals to improve the system performance.

The physiological profiles, the extracted position, shape and motion characteristics and identification profiles of the various persons may be stored in the database 2120.

As and when required, the collated profiles and identification reports of individual persons or a group thereof may be sent to third parties 2126a, 2126b and 2126c. For example, concerned authorities interested in identifying particular individuals may include, but are not limited to, a school, a police station, a municipality department, the parents, a concerned Govt. Department or office, a server, a client device, and so on. The profiles and identification reports are sent from the database 2120 through the communicator 2122 which transmits the information through a communication network 2124. The communication network 2124 may include a Bluetooth network, a Wired LAN, a Wireless LAN, a WiFi Network, a Zigbee Network, a Z-Wave Network or an Ethernet Network.

As few exemplary applications of the invention, the profiles and identification reports of a missing robber or a terrorist or a missing person or a child or a pet if identified in any location may be sent to the police station. The profiles and identification reports may also be sent to a communication device of an owner of the premise such as house when the owner is away, identifying and informing visitors visiting his house during his absence.

Another application of the system may be to track a person's health condition from the way he moves around the house and the shape of his body, as well as from changing habits, such as using the bathroom more often or for longer times at an unusual time of day. The ability to identify a person is important when there is more than one resident. The use of low-resolution radar images maintains privacy since it is impossible to generate a high resolution image of the person, yet it enables identification.

Figure 27:
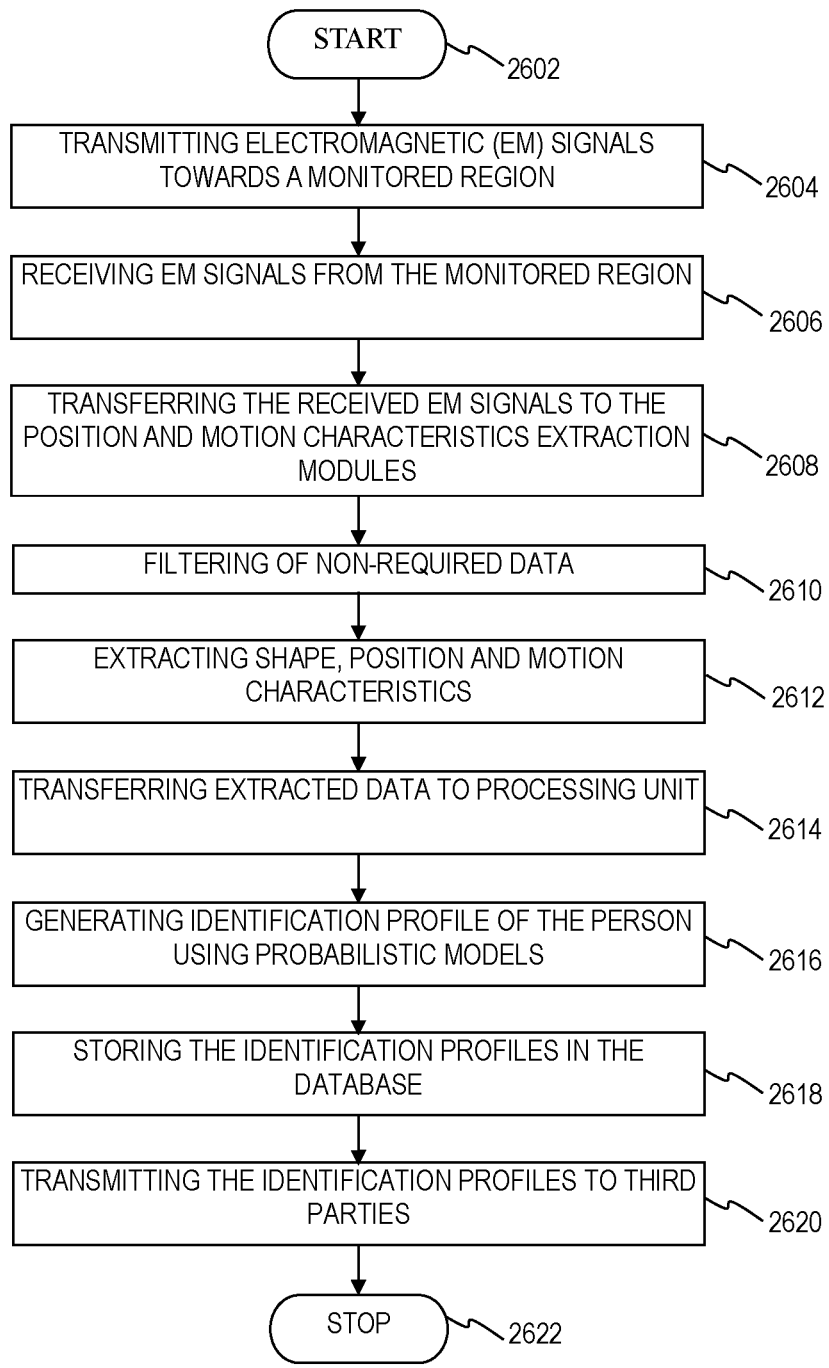
FIG. 27 illustrates a flowchart showing a method for identifying person(s) through the radar-based person identification device according to an aspect of the invention.

Referring to FIG. 27 which is a schematic flowchart illustrating an exemplary method for the personal identification device according to an aspect of the invention. The process starts at step 2602 and electromagnetic waves (EM) are transmitted by the transmitter 2106 of the person identification device 2104 towards the monitored region 2102 at step 2604. The EM waves reflected from the monitored region 2102 are received by the receiver 2110 at step 2606. The received EM signals are transferred to the position characteristic extraction module 2114 and motion characteristic extraction module 2116 of the pre-processing unit 2112 at step 2608.

At step 2610, the position characteristic extraction module 2114 and motion characteristic extraction module 2116 filters out the non-desired data and extracts the shape, the position and motion characteristics of the target person, respectively at step 2612. The extracted position and motion characteristics are transferred to the processing unit 2118 at step 2614. The processing unit 2118 generates a probabilistic identification of the person by applying the stored Artificial Intelligence (AI) algorithms on the position, shape and motion characteristics and the generated physiological parameters of the person. The probabilistic identification is used to generate an identification profile of the person at step 2616. At step 2618, the physiological and identification profiles of the person are stored in the database 2120. As and when required, at step 2620, the physiological and identification profiles of the person may be sent to one or more third parties to inform thereto for the identified person(s). Additionally, or alternatively where appropriate, the identy of the identified person may be sent to a third party rather than the corresponding identification profile. The process is completed at step 2622.

The systems and methods explained above may perform identification of the patient remotely and non-intrusively.

Figure 28:
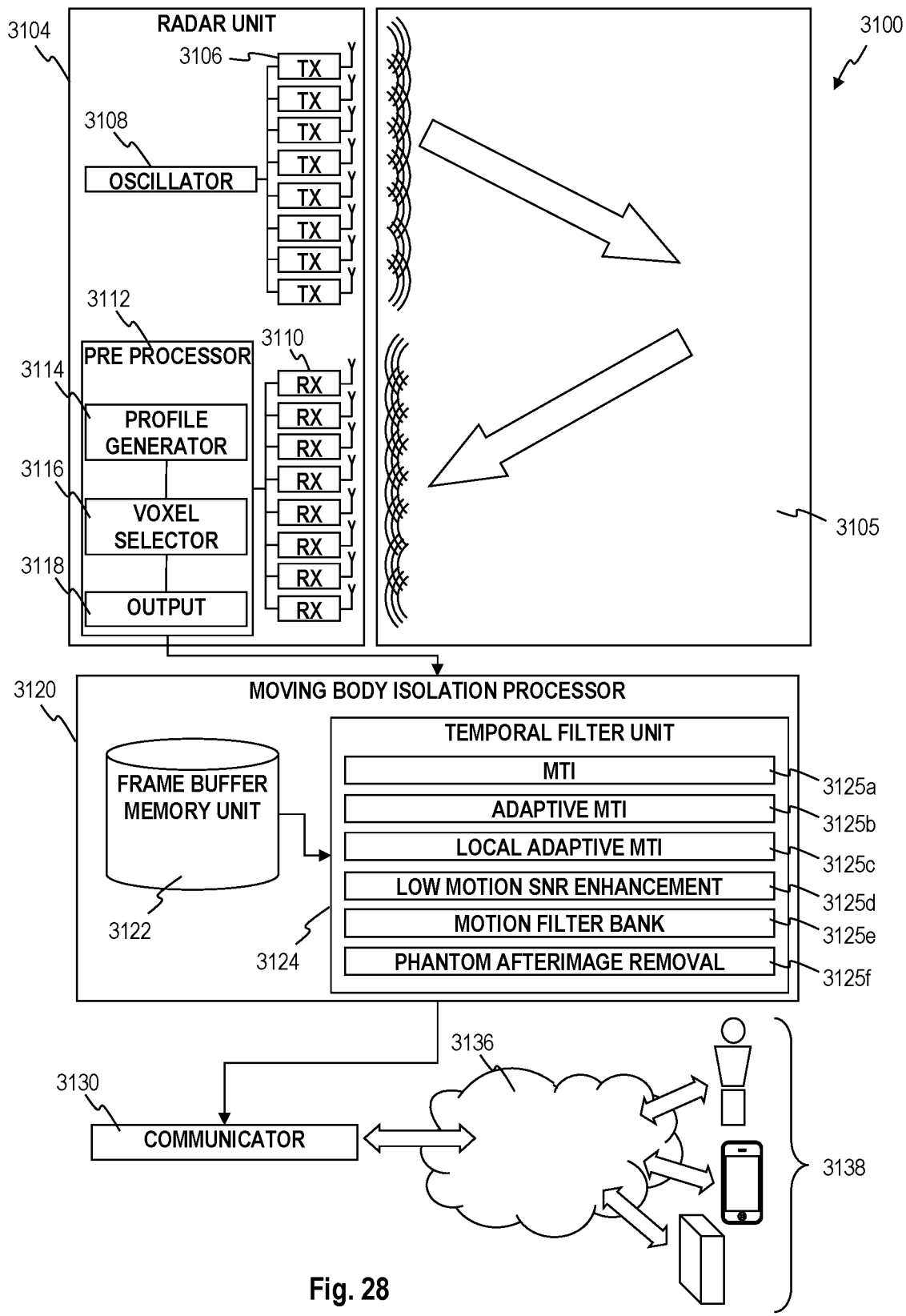
FIG. 28 is a schematic block diagram representing selected components of a possible moving body isolation system incorporated into a radar scanning system.

Reference is now made to FIG. 28 which is a schematic representation of a possible target monitoring and alert system 3100. The fall detection system 3100 includes a radar unit 3104, a processor unit 3120 and a communication module 3130.

The radar unit 3104 includes an array of transmitters 3106 and receivers 3110. The transmitter may include an oscillator 3108 connected to at least one transmitter antenna TX or an array of transmitter antennas. 3106 Accordingly the transmitter may be configured to produce a beam of electromagnetic radiation, such as microwave radiation or the like, directed towards a monitored region 3105 such as an enclosed room or the like. The receiver may include at least one receiving antenna RX or an array of receiver antennas 3110 configured and operable to receive electromagnetic waves reflected by objects 3102 within the monitored region 3105.

The processor unit 3120, may include various modules such as a frame buffer memory unit 3122 and a temporal filter unit 3124. The temporal filter unit may itself include various data filtering modules through which received data may be passed to produce a filtered output. Examples of data filtering modules include moving target indication (MTI) modules 3125*a*, adaptive MTI modules 3125*b*, local adaptive MTI modules 3125*c*, low motion signal-to-noise ratio enhancement modules 3125*d*, motion filter banks 3125*e* and phantom afterimage removal modules 3125*f*. Other filter modules may occur to those skilled in the art.

The communication module 3134 is configured and operable to communicate the output images to third parties 3138. Optionally the communication module 3134 may be in communication with a computer network 3136 such as the internet via which it may communicate alerts to third parties 3138 for example via telephones, computers, wearable devices or the like.

Temporal filters may be used to distinguished objects of interest from background objects as they may be used to highlight reflections from moving objects over reflections from stationary objects such as walls and furniture, or vibrating and swinging objects such as fans, washing machine, plants, curtains and the like. It is further noted that temporal filters may also be used to highlight other slowly changing phenomena such as systematic sensor noise and antenna cross-talk.

Figure 29A:
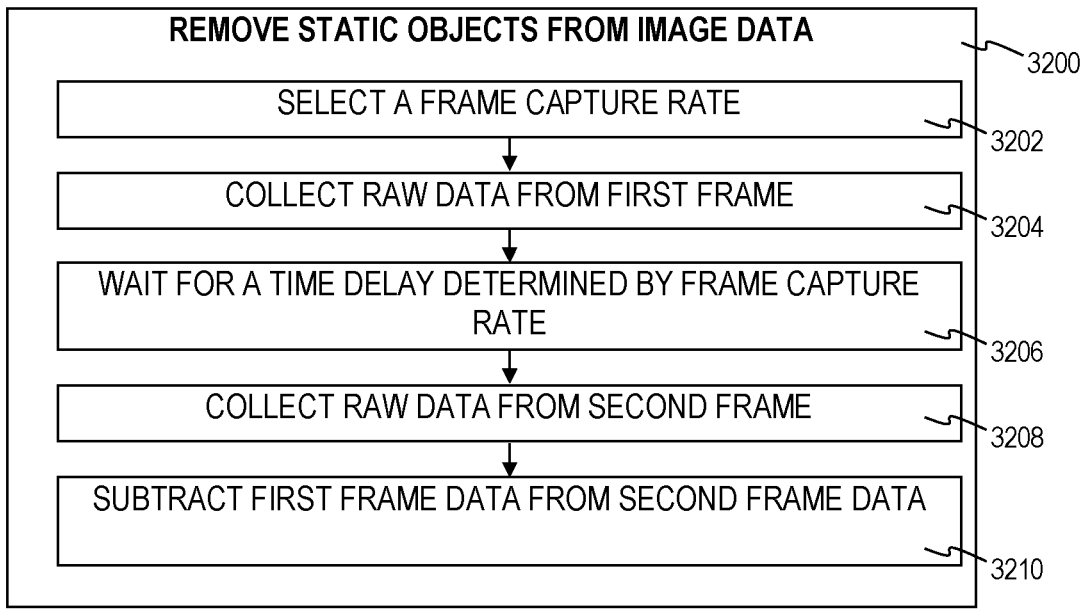
FIG. 29A is a flowchart representing selected steps of a method for removing static objects from image data.

With reference to the flowchart of FIG. 29A, which represents possible actions for removing static objects from image data 3200, a temporal filter may be applied to select a frame capture rate 3202, to collect raw data from a first frame 3204; to wait for a time delay, perhaps determined by frame capture rate 3206; to collect raw data from a second frame 3208; and to subtract first frame data from the second frame data 3210. In this way a filtered image may be produced from which static background is removed and the only moving target data remain.

Figure 29B:
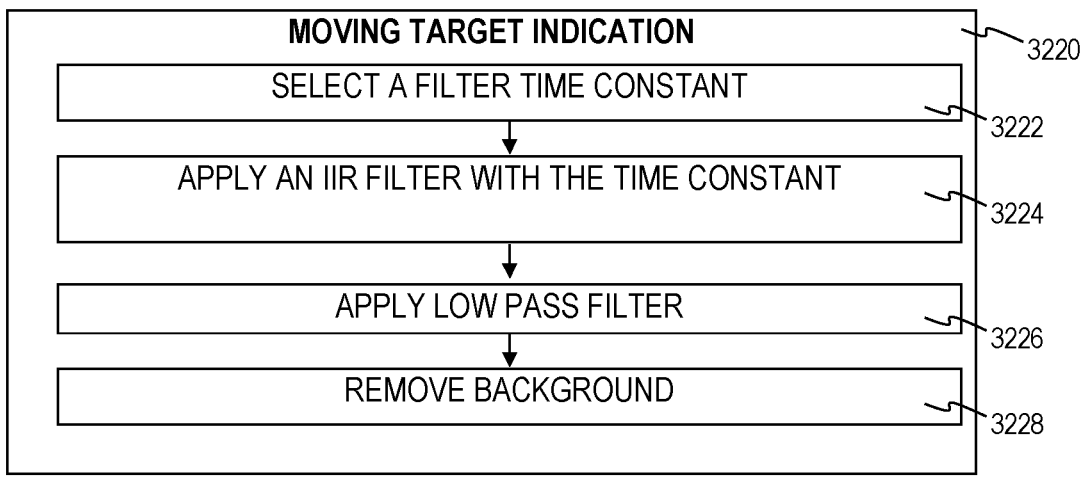
FIG. 29B is a flowchart representing selected steps of a method for moving target indication filtering of 1C image data.

By storing multiple frames within the frame buffer memory unit, the temporal filter may be further improved by applying a Moving Target Indication (MTI) filter as illustrated in FIG. 29B.

An MTI may be applied to data signals before they are transferred to the image reconstruction block or directly to the image data. MTI may estimate background data for example using an infinite impulse response (IIR) low-pass, filter (LPF). This background data is subtracted from the image data to isolate reflections from moving objects. It is noted that such a process may be achieved by subtracting the mean value of several previous frames from the current frame. Optionally, the mean may be calculated by an IIR or an FIR low-pass filter such as the above described LPF implementation.

The MTI IIR filter time constant, or the duration over which the average is taken by the IIR response is generally fixed to best suit requirements, either short to better fit dynamic targets or long to fit still or slow targets.

Accordingly, the MTI method 3220 may include steps such as selecting a filter time constant 3222, applying an IIR filter over the duration of the selected time constant 3224, applying a low pass filter 3226, and removing the background from the raw data 3228.

It has been found that MTI may generate artifacts such as afterimages, or phantoms, when objects are suddenly removed from the background. For example, when a chair is moved, a person moves in their sleep, a wall is briefly occluded, of the like, subsequent background subtraction may cause such events to leave shadows in the image at the previously occupied location. Since signals are complex, it is not possible to distinguish between a real object and its negative shadow.

Similarly, obscured stationary objects in the background may appear to be dynamic when they suddenly appear when uncovered by a moving object in the foreground.

Furthermore, slow changes of interest may be repressed, for example the reflections from people sitting or lying still may change little over time and thus their effects may be attenuated by background subtraction.

Figure 30A:
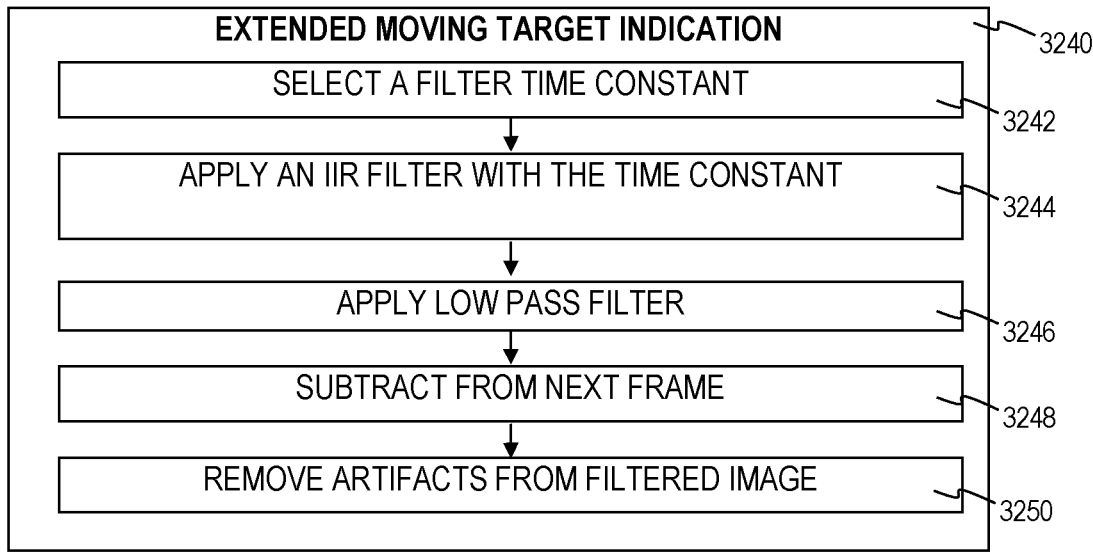
FIG. 30A is a flowchart representing selected steps of a method for extended moving target indication filtering of image data.

Referring now to FIG. 30A illustrating an extended Moving Target Indication filter method 3240, including selecting a filter time constant 3242, applying an IIR filter over the duration of the selected time constant 3244, applying a low pass filter 3246, and the step of removing the background from the raw image may be achieved by subtracting the mean value of several previous frames from the current frame 3248 and further by removing artifacts, such as shadows and phantom afterimages from the filtered image 3250.

It is one aspect of the current disclosure to introduce filters operable to reduce such afterimage images and false dynamic artifacts. The filter may further increase sensitivity to low-motion targets without false detection of static or even vibrating objects.

Figure 30B:
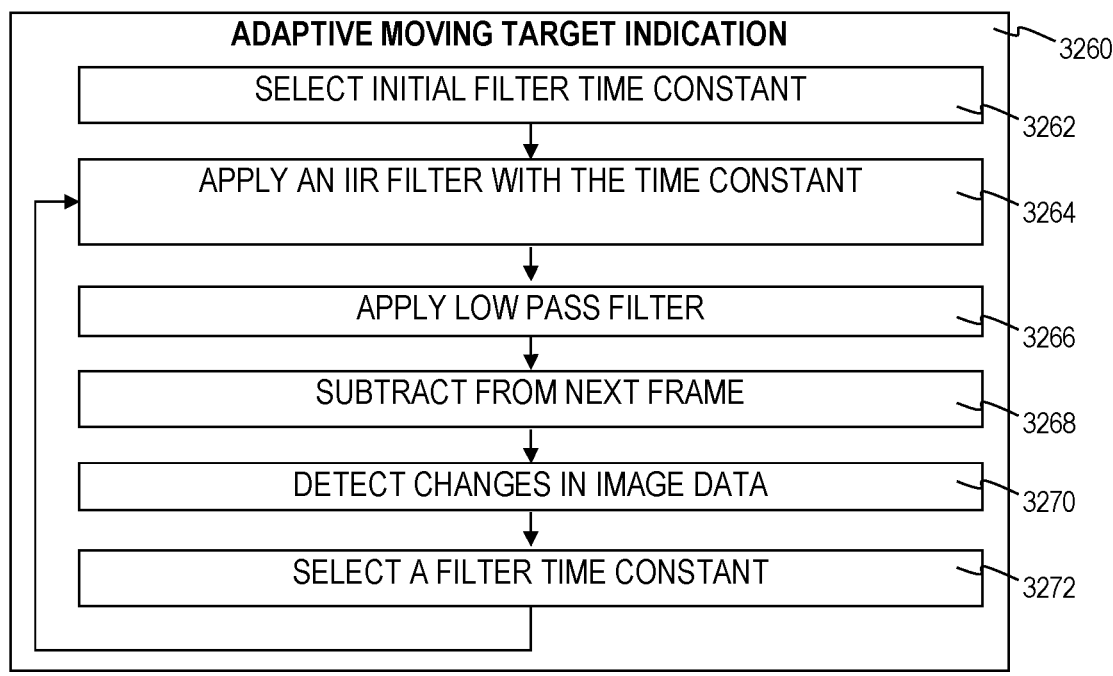
FIG. 30B is a flowchart representing selected steps of a method for adaptive moving target indication filtering of image data.

With reference now to FIG. 30B a method for artifact reduction may include an adaptive MTI unit operable to adjust the IIR filter time constant for the image data according to detected changes in the data 3260. Accordingly, a short time constant may be selected for large changes thereby reducing dynamics artifacts. Longer time constants may be selected for small changes so as to increase sensitivity to low-motion targets because each instantaneous image is more different from the average of many frames than from a few recent frames.

Thus, a method is taught for selecting an initial filter time constant 3262, applying an IIR filter with the initial filter time constant 3264, applying a low pass filter 3266 and subtracting the result from the next frame 3268. Changes in the image data are detected 3270 and the filter time constant is updated accordingly before processing further data 3272.

The abovementioned examples of MTI filtering consider all the frame data as a whole, producing a common time constant for all the voxels within the frame. It has been surprisingly found that the method of adaptive MTI may itself be extended beyond selection of a general time constant for the whole frame.

Figure 30C:
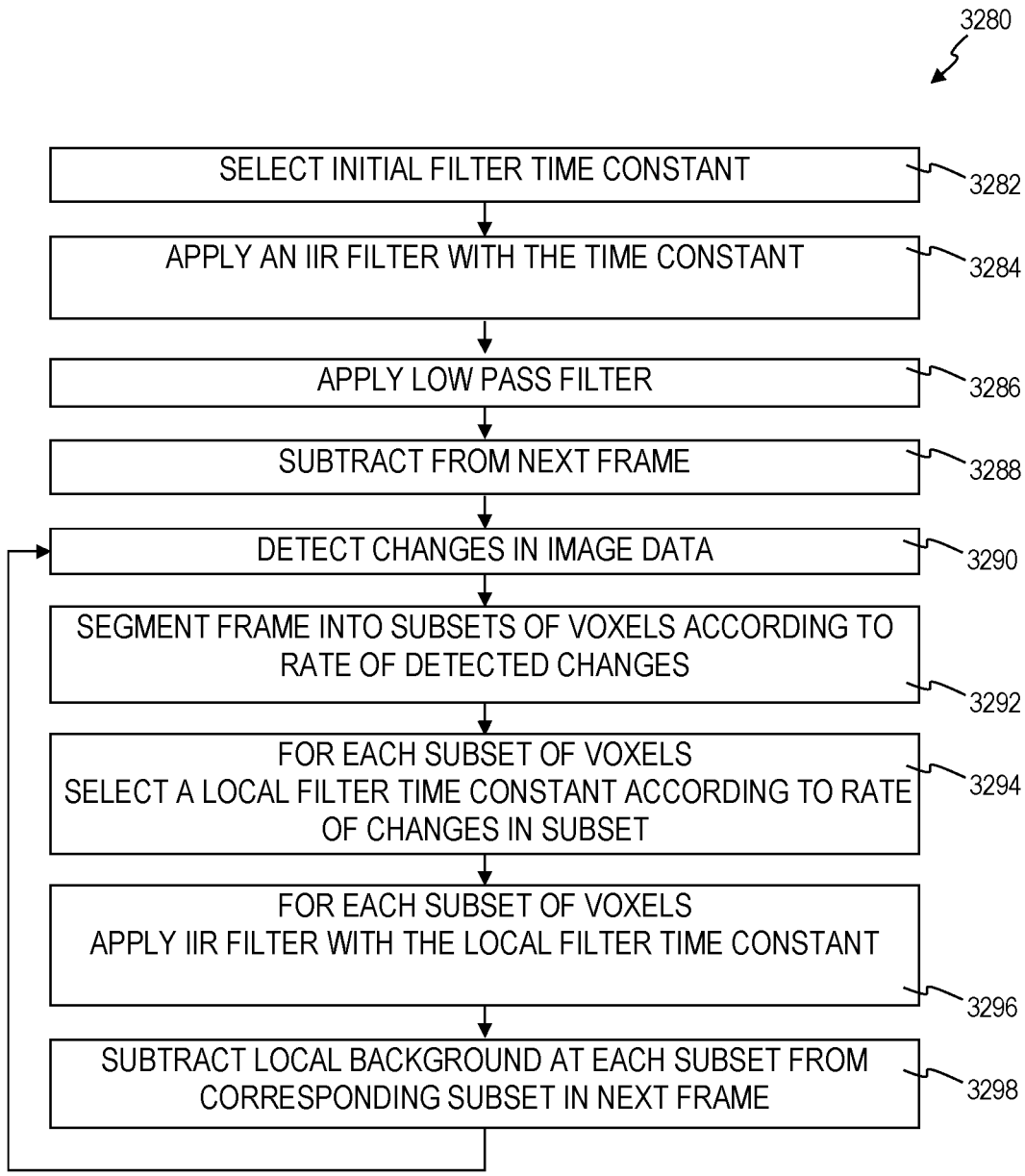
FIG. 30C is a flowchart representing selected steps of a method for segmented frame moving target indication filtering of image data.

Referring now to FIG. 30C, a method for segmented frame MTI is illustrated wherein a localized time constant may be selected for each subset of voxels 3280. The method includes the steps of selecting an initial filter time constant 3282, applying an IIR filter of the duration of the initial filter time constant 3282, applying a low pass filter 3286 and subtracting the result from the next frame 3288. Changes in the image data are detected 3290 and the rate of those changes is determined for each subset of voxels.

The filter may further segment the frame into subsets of voxels according to the local rate of change of image data 3292. A local filter time constant may be set for each subset of voxels as suits the local rate of change of image data 3294. The IIR filer is applied to each subset of voxels over the duration of the associated local filter time constant 3296. The local background may be subtracted from each subset of voxels in the next frame of image data 3298.

It is noted that in an extreme version of the segmented frame MTI, a subset may include only one voxel and the local time constant may be selected for only one voxel. Indeed, a time constant may be selected for each voxel separately or for each region of the image as required. Accordingly, the time constant may be optimized for multiple phenomena occurring simultaneously in the same set of image data.

Figure 31A:
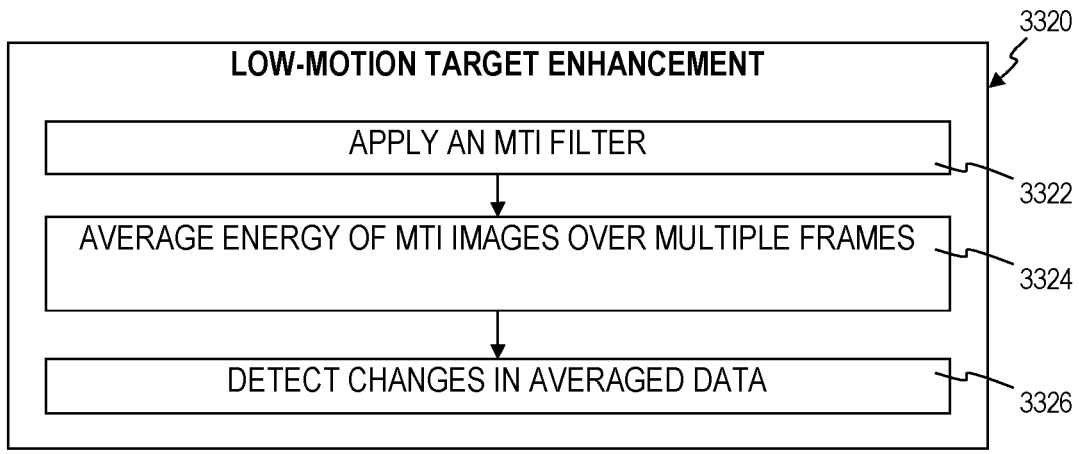
FIG. 31A is a flowchart representing selected steps of a method for low-motion target enhancement.

Various methods may be used to enhance low-motion targets. For example, as illustrated in FIG. 31A, one method 3320 includes applying an MTI filter 3322. The energy values, such as magnitude, sigmoid of magnitude, or other such energy function, of the Moving Target Indication (MTI) images may be averaged over several frames 3324 and changes may be detected in the averaged data 3326.

It is noted that the signal and noise combined typically have a higher average value than the noise alone. Accordingly, the signal-to-noise ratio of the average is greater than one, which may enable the detection of low-motion and low SNR targets such as a breathing person lying still.

It will be appreciated that the improved signal-to-noise ratio may further enhance the signal reflected from stationary vibrating reflecting objects in the background as well as foreground moving objects of interest. Accordingly, isolation functioning may be applied to distinguish between the micro-motion of vibrating objects with amplitudes smaller than say one millimetre from low-motion of a breathing person at amplitude of around one centimetre.

Figure 31B:
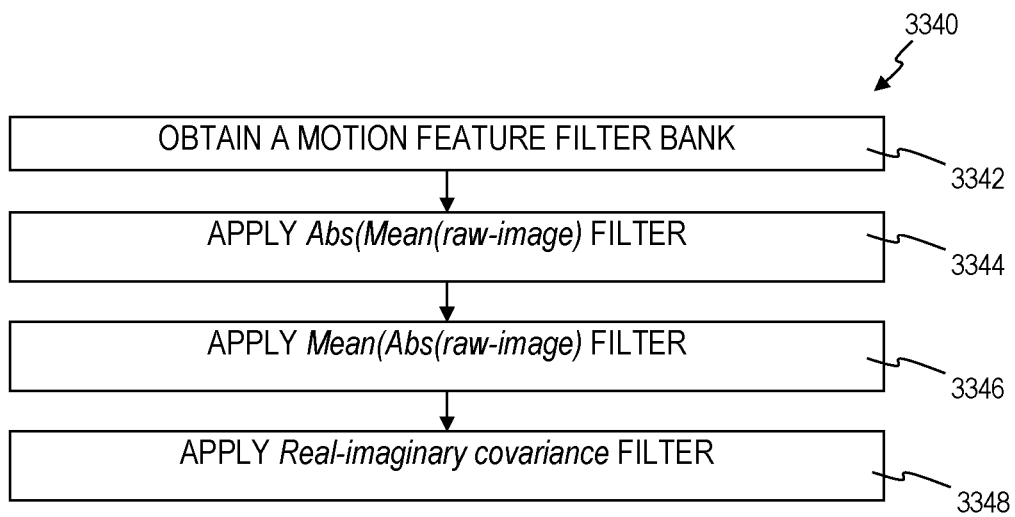
FIG. 31B is a flowchart representing selected steps of a possible method for filtering image data including low-motion.

As illustrated in FIG. 31B, other methods for enhancing the low motion targets 3340 include applying a Motion feature filter bank 3340. A combination of filters may be applied to extract various temporal features. The motion feature filter bank may distinguish between different motion types based on phase changes and statistics. Examples of methods of application of such filters may include applying a Mean(Abs(raw-image)) filter 3344, applying an Abs(Mean (raw-image) filter 3346, and applying a Real-imaginary parts covariance matrix eigenvalues filter 3348. It will be appreciated that the filters may be applied in any order or combination as required.

There are various ways to process the raw data of low-Motion Targets. For example, accumulate energy may be calculated as any of:

the $L_0$ norm, $\Sigma x$,
where x=1 if |RawImg−BG|>threshold, and x=0 otherwise;
the $L_1$ norm, $\Sigma|\text{RawImg}-\text{BG}|$; or
the $L_2$ norm $\sqrt{\Sigma|\text{Rawling}-\text{BG}|^2}$ as suits requirements. Accordingly, low-motion high Radial Cross Section (RCS) static interferers may be detected if the mean of the absolute value, Mean(Abs (RawImg)), is close to the absolute value of the mean, Abs(Mean(RawImg)). Similarly, if the phasor eigenvalues $\lambda_1$, $\lambda_2$ obey either $((\lambda_1-\lambda_2)>\theta_{Circ}*(\lambda_1+\lambda_2))$ or $(\lambda_2<\theta_{SNR}*\text{noise})$.

Figure 32A:
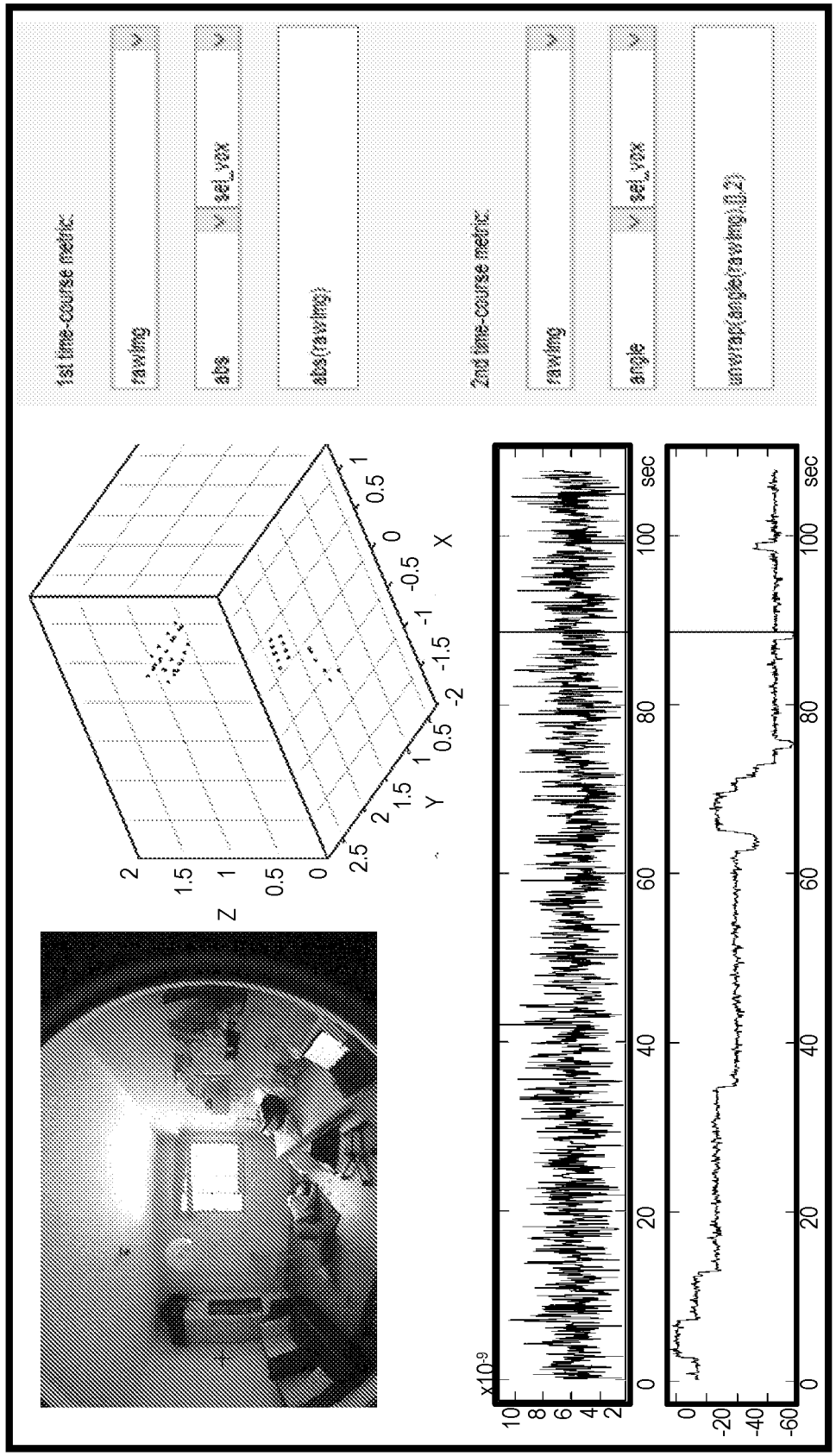
FIGS. 32A-C present plots over time of magnitude and phase of the reconstructed signal at three indicated voxels within a target region.
Figure 32B:
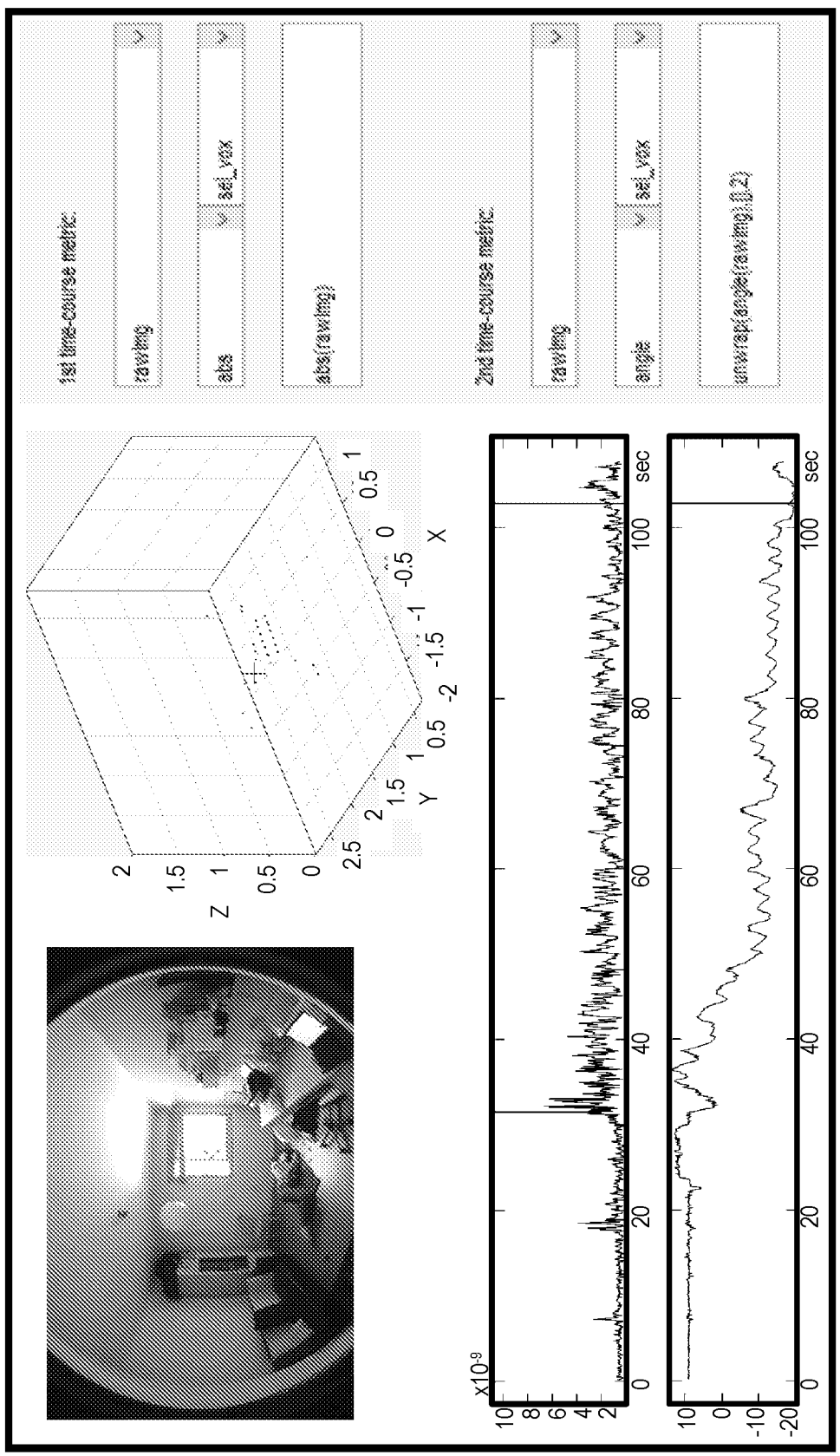
Figure 32C:
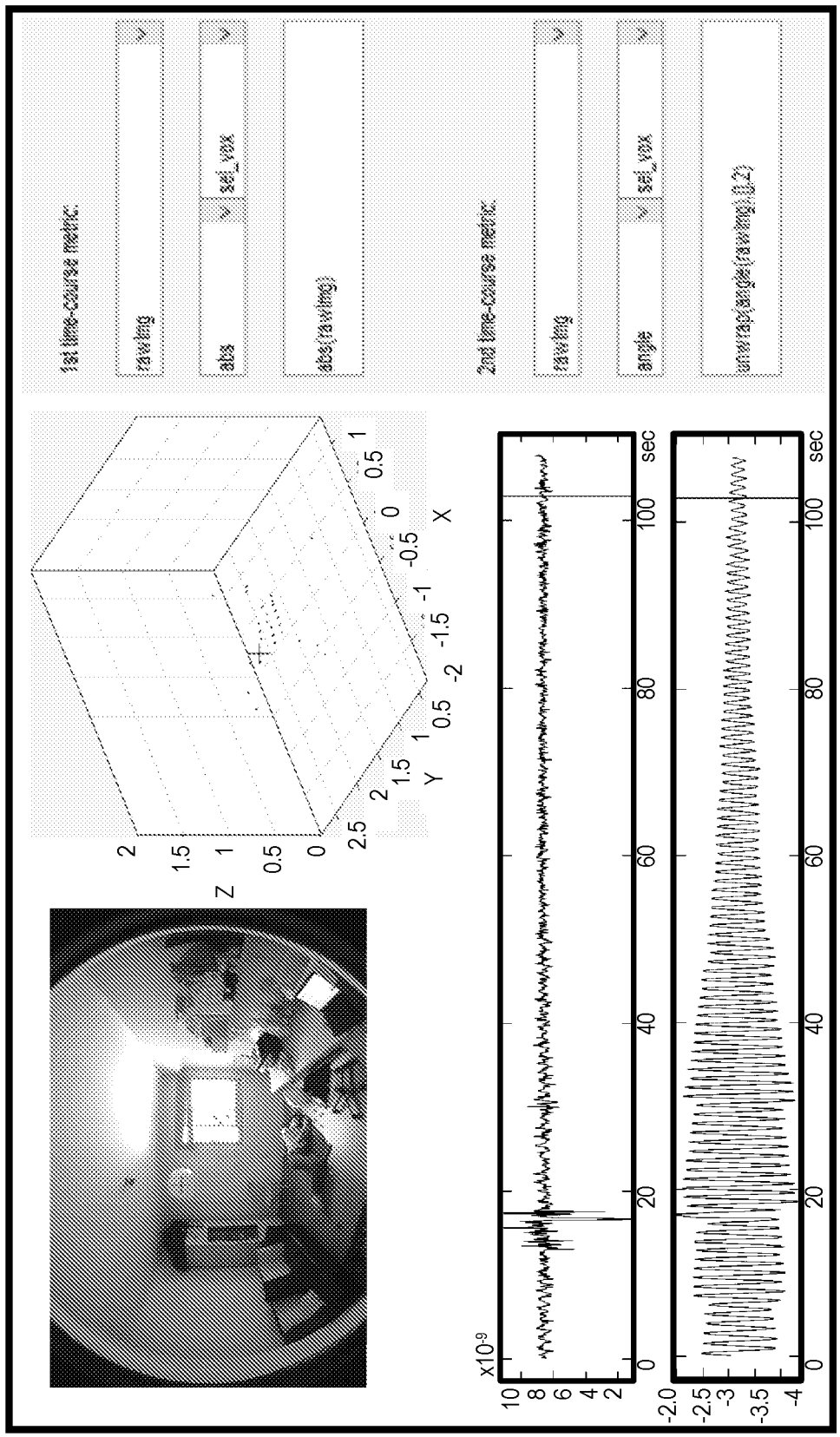

By way of example and so as to better to illustrate how filters may be used to distinguish between different motion types, reference is now made to FIGS. 32A-C which present plots over time of magnitude and phase of the signal reconstructed at three indicated voxels within a target region.

Figure 33A:
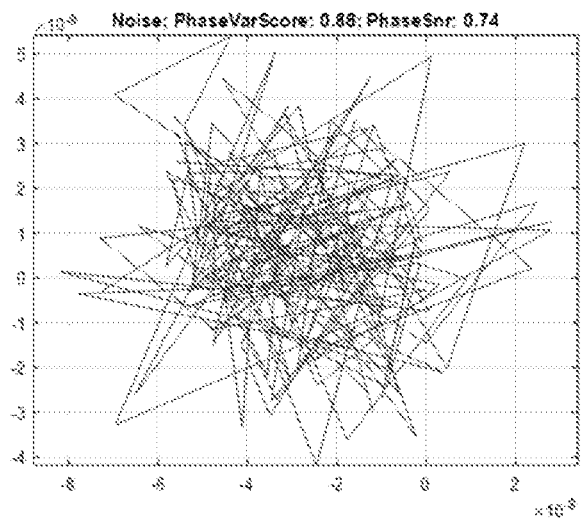
FIGS. 33A-C present plots of the first and second eigenvalues of the reconstructed signal at the three different voxels indicated in FIGS. 32A-C respectively.
Figure 33B:
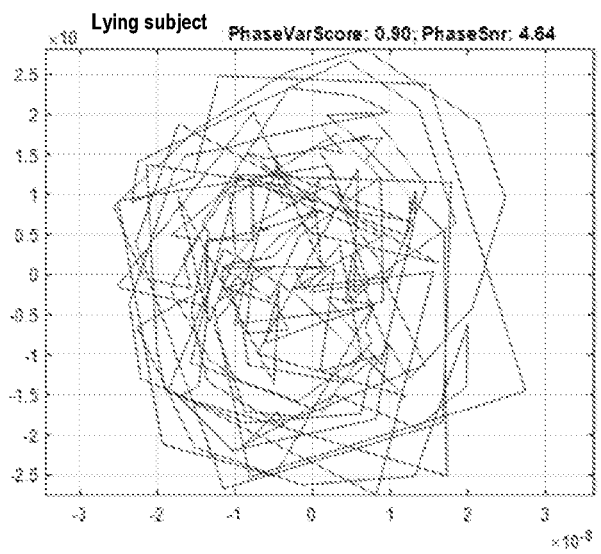
Figure 33C:
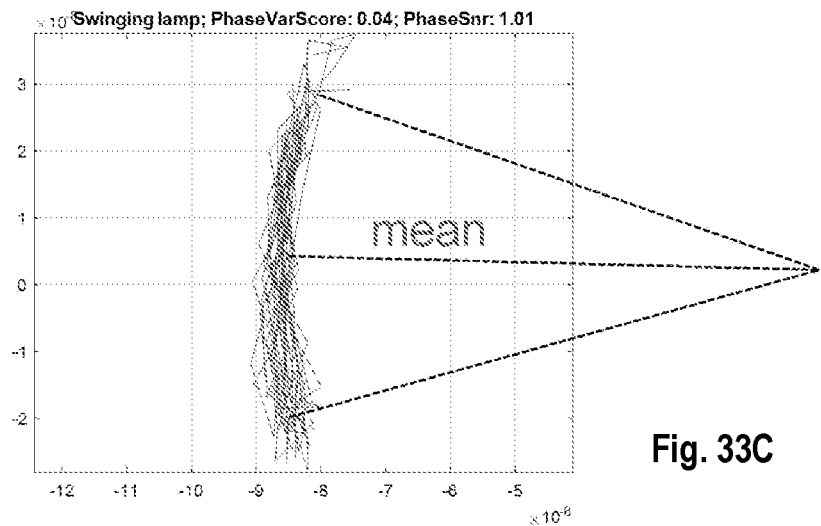

The graphs of FIGS. 33A-C present plots of the x eigenvalues and y eigenvalues of energy received from the three different voxels indicated in FIGS. 32A-C respectively. The plot of FIG. 33A showing an apparent random phase distribution about a central point is typical of background noise. The plot of FIG. 33B showing a generally circular phase distribution about a central point is typical of a breathing subject not otherwise moving, indeed this phase distribution was obtained from a voxel reflecting energy from a lying subject. The plot of FIG. 33C showing a phase distribution around an arc with a large radius is typical of a slowly oscillating object, in this case a swinging lamp.

Figure 34A:
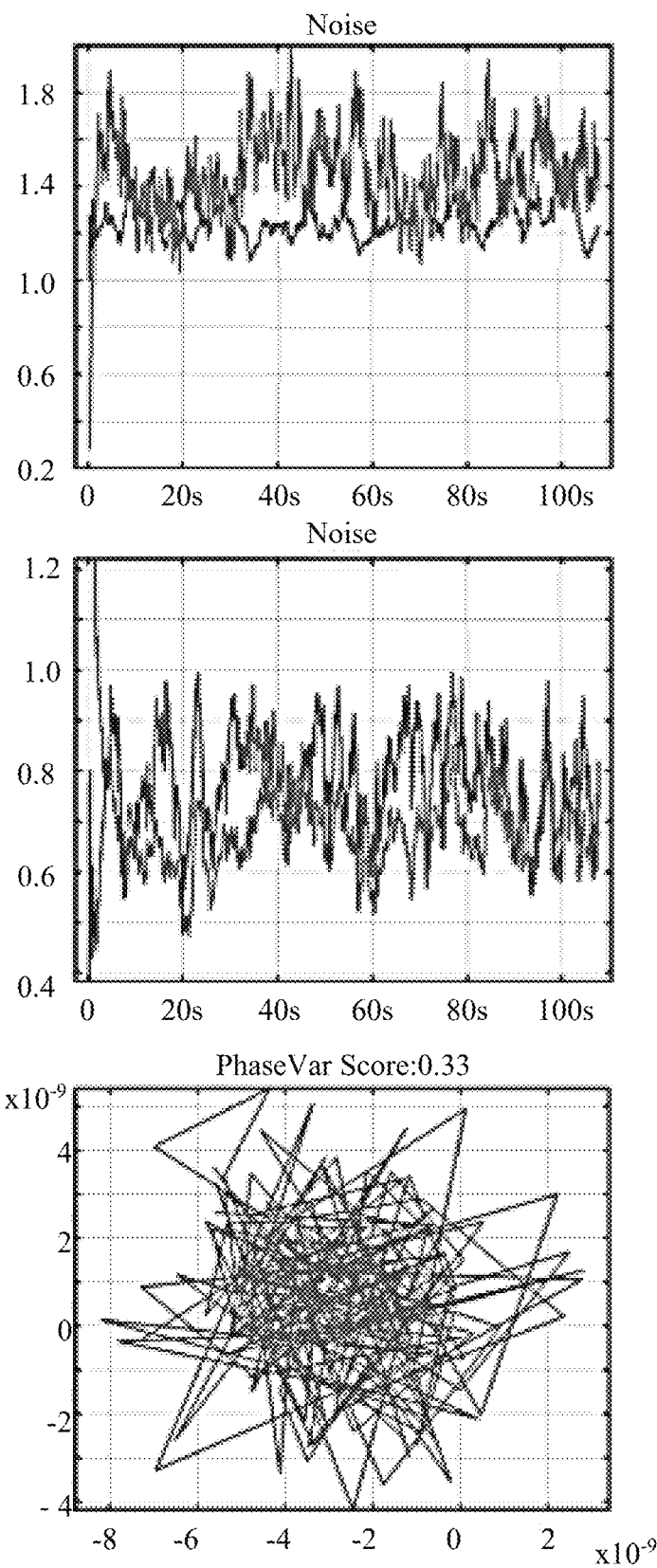
FIGS. 34A-C illustrate different signal features associated with the three voxel points indicated in FIGS. 32A-C.
Figure 34B:
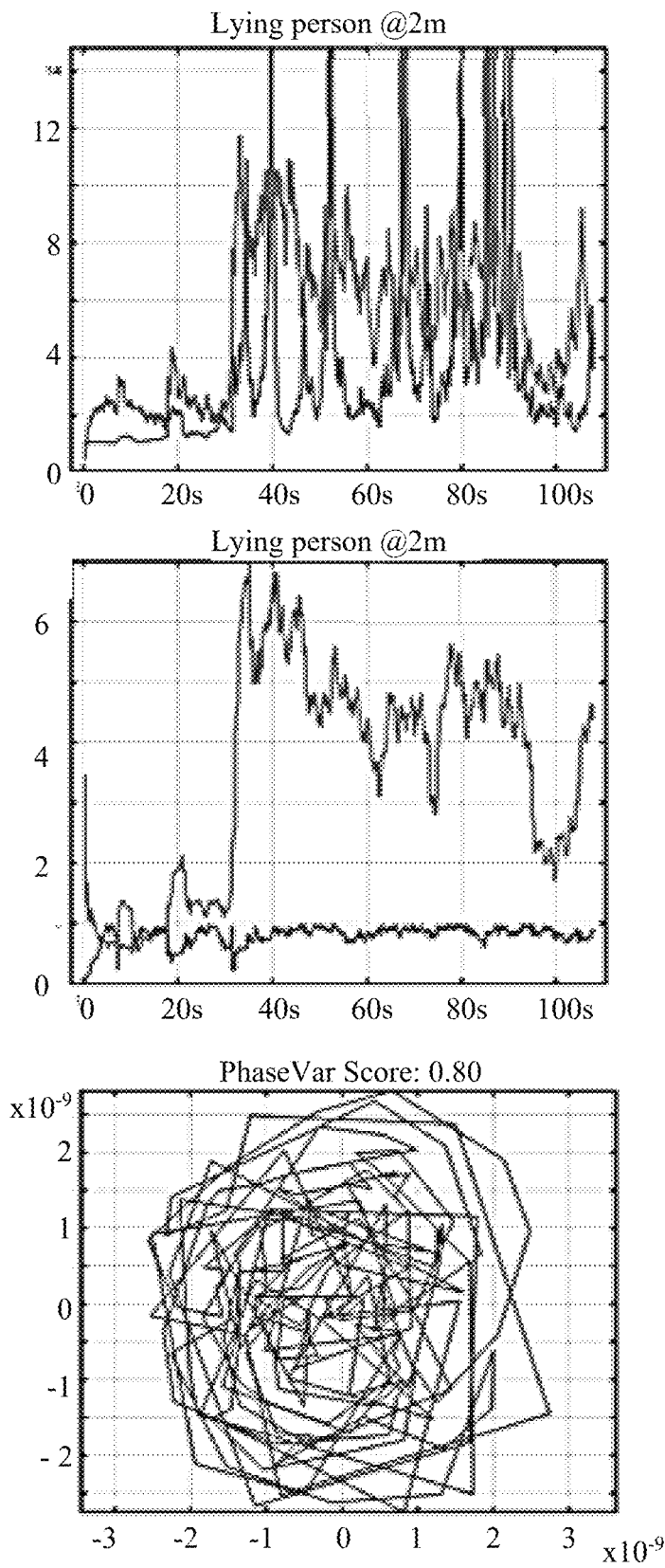
Figure 34C:
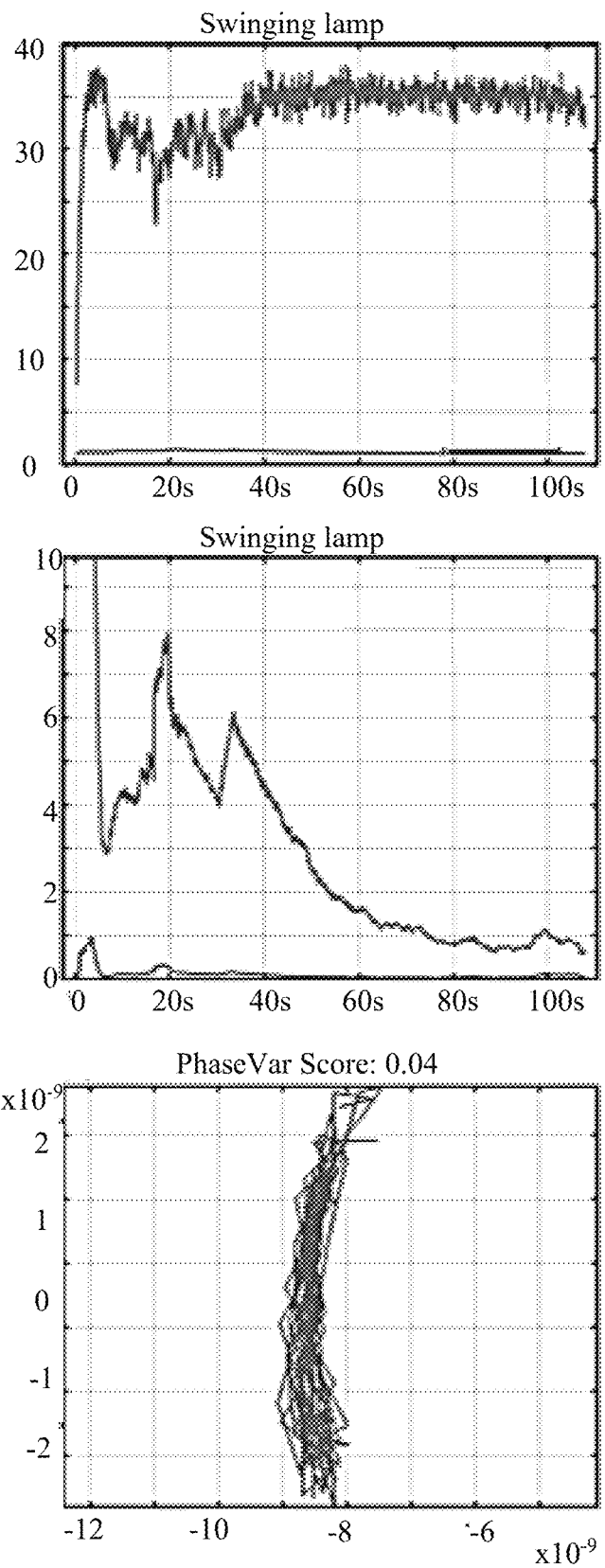

FIGS. 34A-C illustrate still further plots associated with the three voxel points indicated in FIGS. 32A-C. In particular:

In the first row mean(abs)/abs(mean) is plotted in blue, and SNR=RawImg/NoiseRMS is plotted in red.

Figure 35:
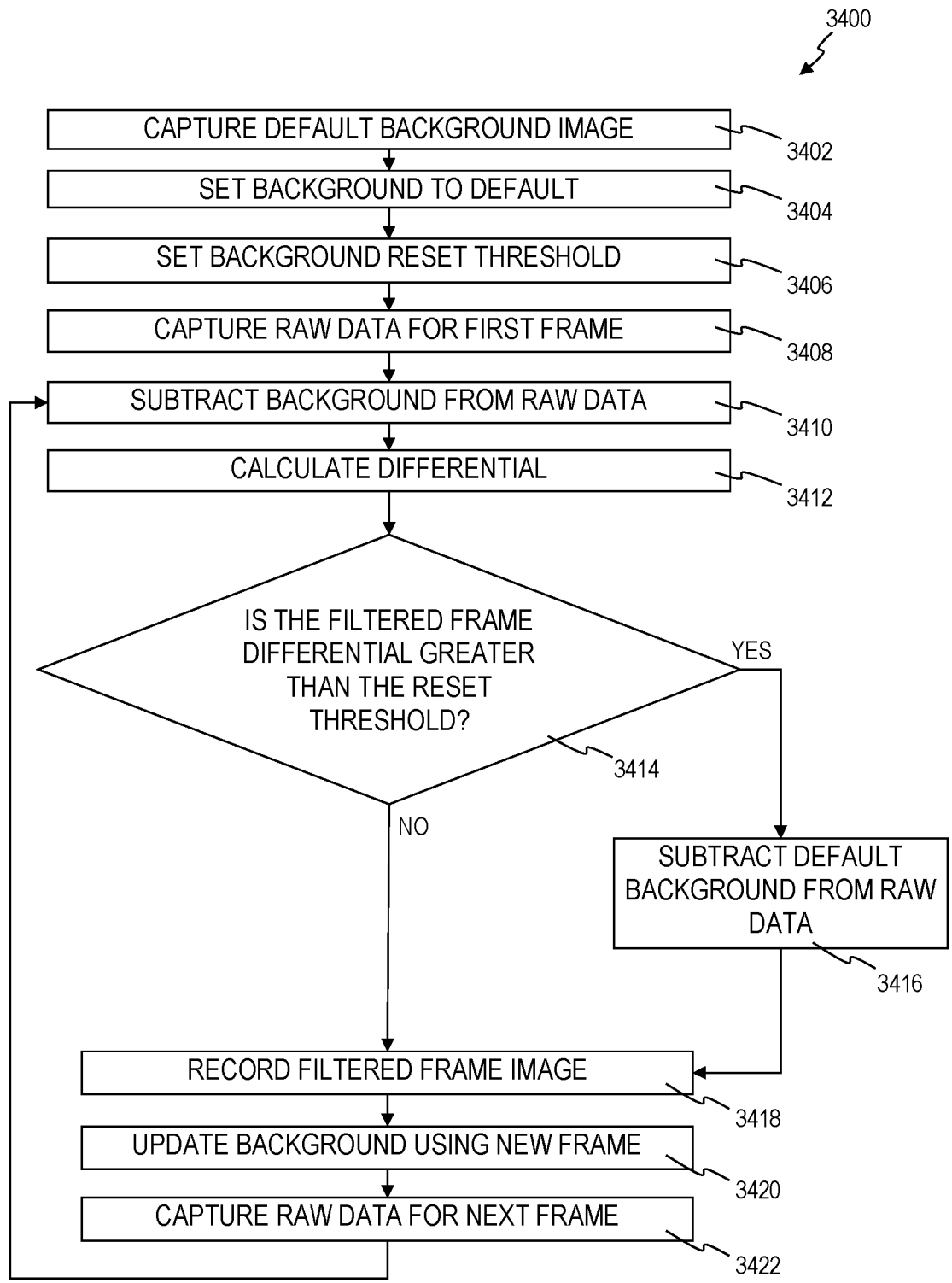
FIG. 35 is a flowchart representing selected steps of a method for removing afterimage images generated by background removal.

In the second row, $2\lambda_2/(\lambda_1-\lambda_2)$ is plotted in blue, and $\lambda_2$/NoiseRMS is plotted in red Referring back to FIG. 30A, a further method for removing artifacts from the temporally filtered image may be to reset the background data to a default value when a large change occurs. With reference now to the flowchart of FIG. 35, selected steps are presented of a method 3400 for removing afterimage images generated by background removal. The method may include, capturing a default background image 3402 possibly during set up, upon significant change of target region or at a regular interval such as daily, hourly, periodically as appropriate. This image is set to be the default value for a background 3404.

A background reset threshold is set 3406 which determines the largest change of data between frames that is to be considered reasonable for noise only. When a frame of raw data is captured, the background is subtracted from the raw data 3410, but the resulting candidate filtered data is not necessarily recorded as the frame image. Before recording the frame image, the difference between the candidate filtered data and the last recorded frame image is calculated 3412 and compared to the threshold value 3414. It is noted that, where appropriate, the background may be reset for each voxel separately depending upon the raw-background difference as described in FIG. 30C.

If the difference is below the threshold then the new filtered data is recorded as the next frame image, ImgOut=ImgIn−BgImg 3418. Then the background is updated using the candidate frame 3420 and the raw data is captured for the next frame 3422. For example the new frame may be saved to the frame buffer memory unit used by the MTI filter as described herein, say using the formula BgImg=(1−a)*BgImg+a+ImgIn.

If the difference is above the threshold, then before the filtered frame image is recorded the background is reset to the default value according to the formula:

If ImgOut>thr*noise then BgImg=ImgIn and it is the default background value that is subtracted from the raw data 3416. The resulting filtered data is then recorded as the next filtered frame image 3418.

It is appreciated that certain features of the invention, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments, unless the embodiment is inoperative without those elements.

Although the invention has been described in conjunction with specific embodiments thereof, it is evident that other alternatives, modifications, variations and equivalents will be apparent to those skilled in the art. Accordingly, it is intended to embrace all such alternatives, modifications, variations and equivalents that fall within the spirit of the invention and the broad scope of the appended claims. Additionally, the various embodiments set forth hereinabove are described in terms of exemplary block diagrams, flow charts and other illustrations. As will be apparent to those of ordinary skill in the art, the illustrated embodiments and their various alternatives may be implemented without confinement to the illustrated examples. For example, a block diagram and the accompanying description should not be construed as mandating a particular architecture, layout or configuration.

Technical Notes

Technical and scientific terms used herein should have the same meaning as commonly understood by one of ordinary skill in the art to which the disclosure pertains. Nevertheless, it is expected that during the life of a patent maturing from this application many relevant systems and methods will be developed. Accordingly, the scope of the terms such as computing unit, network, display, memory, server and the like are intended to include all such new technologies a priori.

As used herein the term "about" refers to at least ±10%.

The terms "comprises", "comprising", "includes", "including", "having" and their conjugates mean "including but not limited to" and indicate that the components listed are included, but not generally to the exclusion of other components. Such terms encompass the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" may include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between. It should be understood, therefore, that the description in range format is merely for convenience and brevity and should not be construed as an inflexible limitation on the scope of the disclosure. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6 as well as non-integral intermediate values. This applies regardless of the breadth of the range.

It is appreciated that certain features of the disclosure, which are, for clarity, described in the context of separate embodiments, may also be provided in combination in a single embodiment. Conversely, various features of the disclosure, which are, for brevity, described in the context of a single embodiment, may also be provided separately or in any suitable sub-combination or as suitable in any other described embodiment of the disclosure. Certain features described in the context of various embodiments are not to be considered essential features of those embodiments unless the embodiment is inoperative without those elements.

Although the disclosure has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

The scope of the disclosed subject matter is defined by the appended claims and includes both combinations and sub combinations of the various features described herein above as well as variations and modifications thereof, which would occur to persons skilled in the art upon reading the foregoing description.

The invention claimed is:

1. A target monitoring and alert system comprising a radar unit, a processor unit and a communication module, the radar unit including
    at least one transmitter antenna connected to an oscillator and configured to transmit electromagnetic waves into a monitored region, and
    at least one receiver antenna configured to receive electromagnetic waves reflected by objects within the monitored region and operable to generate raw data;
    the processor unit including a moving body isolation processor, and the communication module configured and operable to communicate alerts to third parties;
    wherein:
    the processor unit further comprises:
        a frame buffer memory unit for storing frame data;
        a data filter configured to receive said raw data, and operable to process the raw data to remove data relating to reflections from static objects thereby generating filtered data;
        a tracker module configured to receive the filtered data from the data filter and operable to process the filtered data to identify moving targets and to track the location of the moving targets over time thereby generating target data;
        an alert-threshold generator operable to generate an alert-threshold;
        a neural network configured to receive from the tracker module target data inputs selected from height profiles, signal-to-noise ratio and radial distance to object and operable to generate a fall likelihood score; and
        a fall identification module configured to receive the fall likelihood score from the neural network and operable to generate a fall alert if the likelihood score is above an alert-threshold value,
    wherein the data filter comprises a temporal filter unit through which received data may be passed to produce filtered output,
    wherein the temporal filter comprises at least a local adaptive moving target indication module, and
    wherein the local adaptive moving target indication module is operable to select an initial filter time constant, to apply an infinite impulse response filter with the initial filter time constant, to apply a low pass filter, to subtract the result from the next frame, to detect changes in image data, to spatially segment the frame into subsets of voxels according to the local rate of change of image data, to set a local filter time constant for each subset of voxels as suits the local rate of change of image data, to apply the infinite impulse response filter to each subset of voxels over an associated local filter time constant, and to subtract local background from each subset of voxels in a next frame of image data.

2. The target monitoring and alert system of claim 1 wherein the alert-threshold generator is configured to receive communication from a fall alert mitigation manager.

3. The target monitoring and alert system of claim 2 wherein the alert mitigation manager is configured and operable to receive input from a telemetric system and to use a sensitivity map to generate the alert threshold value.

4. The target monitoring and alert system of claim 1 wherein the temporal filter is operable to select a frame capture rate, to collect raw data from a first frame; to wait for a time delay, to collect raw data from a second frame; and to subtract first frame data from the second frame data.

5. The target monitoring and alert system of claim 1 wherein the temporal filter comprises at least a moving target indication module.

6. The target monitoring and alert system of claim 5 wherein the moving target indication is operable to select a filter time constant, to apply an infinite impulse response filter over during the filter time constant, to apply a low pass filter, and to remove background from the raw data.

7. The target monitoring and alert system of claim 1 wherein the temporal filter comprises at least an adaptive moving target indication module.

8. The target monitoring and alert system of claim 7 wherein the adaptive moving target indication module is operable to select an initial filter time constant, to apply an infinite impulse response filter with the initial filter time constant, to apply a low pass filter, to subtract the result from the next frame, to detect changes in image data, and to update the filter time constant accordingly.

9. The target monitoring and alert system of claim 1 wherein the temporal filter comprises at least an extended moving target indication module.

10. The target monitoring and alert system of claim 9 wherein the adaptive moving target indication module is operable to select a filter time constant, to apply an infinite impulse response filter during the filter time constant, to apply a low pass filter, to subtract a mean value of several previous frames from the current frame and to remove artifacts from the filtered image.

11. The target monitoring and alert system of claim 1 wherein the temporal filter comprises at least a low motion signal-to-noise ratio enhancement module.

12. The target monitoring and alert system of claim 11 wherein the low motion signal-to-noise ratio enhancement module is operable to apply a low signal-to-noise ratio temporal filter, to average energy values of the Moving Target Indication (MTI) images over several frames and to detect changes in the averaged data.

13. The target monitoring and alert system of claim 1 wherein the temporal filter comprises at least a motion filter bank.

14. The target monitoring and alert system of claim 1 wherein the processor unit further comprises a person identification module including a position characteristic extraction module and a motion characteristic extraction module.

15. The target monitoring and alert system of claim 14 wherein the processor unit is operable to generate a probabilistic identification of a target by applying a stored Artificial Intelligence (AI) algorithms on the position and motion characteristics of the target.

16. The target monitoring and alert system of claim 15 wherein the processor unit is further operable to generate an identification profile of the person.

* * * * *